US012688752B2

(12) United States Patent
Sanchez Miranda et al.

(10) Patent No.: US 12,688,752 B2
(45) Date of Patent: Jul. 21, 2026

(54) TRANSFERRING FUNDS BETWEEN AN ELECTRONIC GAMING MACHINE AND A FINANCIAL INSTITUTION ACCOUNT UTILIZING A CASHLESS PAYMENT TERMINAL

(71) Applicant: IGT, Las Vegas, NV (US)

(72) Inventors: Jose Diego Sanchez Miranda, Malaga (ES); Jason Ingles, North Las Vegas, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 272 days.

(21) Appl. No.: 18/544,929

(22) Filed: Dec. 19, 2023

(65) Prior Publication Data

US 2025/0201071 A1     Jun. 19, 2025

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G06Q 20/04* | (2012.01) |
| *G06Q 50/34* | (2012.01) |
| *G07F 17/32* | (2006.01) |

(52) U.S. Cl.
CPC ..... *G07F 17/3244* (2013.01); *G06Q 20/0457* (2013.01); *G06Q 50/34* (2013.01); *G07F 17/3223* (2013.01)

(58) Field of Classification Search
CPC ... G07F 17/32; G07F 17/3214; G07F 17/3222

USPC .............................. 463/1, 20, 22, 25, 30, 39
See application file for complete search history.

(56) References Cited

U.S. PATENT DOCUMENTS

| | | | |
|---|---|---|---|
| 7,708,638 | B2 | 5/2010 | Enzminger et al. |
| 7,950,996 | B2 | 5/2011 | Nguyen et al. |
| 8,512,144 | B2 | 8/2013 | Johnson et al. |
| 8,595,137 | B2 | 11/2013 | Sears et al. |
| 8,708,809 | B2 | 4/2014 | Sanford et al. |
| 8,734,236 | B2 | 5/2014 | Arezina et al. |
| 8,932,140 | B2 | 1/2015 | Gagner et al. |
| 8,998,708 | B2 | 4/2015 | Sanford et al. |
| 9,155,959 | B2 | 10/2015 | Riera Jorba et al. |
| 9,196,123 | B2 | 11/2015 | Sanford et al. |
| 9,466,176 | B2 | 10/2016 | Sanford et al. |
| 9,785,926 | B2 | 10/2017 | Sanford et al. |
| 10,810,835 | B2 | 10/2020 | Higgins et al. |
| 11,074,783 | B2 | 7/2021 | Sanford et al. |
| 11,183,015 | B2 | 11/2021 | Higgins et al. |

(Continued)

FOREIGN PATENT DOCUMENTS

EP          0506873  B1      3/2000

OTHER PUBLICATIONS

International Search Report and Written Opinion for International Application No. PCT/US2024/060770 dated Jun. 16, 2025.

(Continued)

*Primary Examiner* — Adetokunbo O Torimiro
(74) *Attorney, Agent, or Firm* — Neal, Gerber & Eisenberg LLP

(57)          ABSTRACT

Systems and methods that utilize a cashless payment terminal to transfer, in accordance with a funding source, funds between an electronic gaming machine and a financial institution account.

20 Claims, 12 Drawing Sheets

(56) References Cited

U.S. PATENT DOCUMENTS

| | | | |
|---|---|---|---|
| 11,270,553 B1 | 3/2022 | Huke et al. | |
| 11,521,460 B2 | 12/2022 | Soukup et al. | |
| 11,615,502 B2 | 3/2023 | Manilla et al. | |
| 11,636,730 B2 | 4/2023 | Higgins et al. | |
| 11,842,605 B2 | 12/2023 | Shepherd et al. | |
| 2007/0293306 A1* | 12/2007 | Nee | G07F 17/32 |
| | | | 463/25 |
| 2009/0005159 A1 | 1/2009 | Netley et al. | |
| 2011/0118008 A1 | 5/2011 | Taylor | |
| 2012/0122584 A1 | 5/2012 | Nguyen | |
| 2012/0122585 A1 | 5/2012 | Nguyen | |
| 2013/0013389 A1 | 1/2013 | Vitti et al. | |
| 2013/0053133 A1 | 2/2013 | Schueller | |
| 2013/0065668 A1 | 3/2013 | Lemay et al. | |
| 2013/0090155 A1 | 4/2013 | Johnson | |
| 2013/0130778 A1 | 5/2013 | Anderson et al. | |
| 2013/0225279 A1 | 8/2013 | Patceg et al. | |
| 2014/0121005 A1 | 5/2014 | Nelson et al. | |
| 2015/0065231 A1 | 3/2015 | Anderson et al. | |
| 2016/0284169 A1 | 9/2016 | Racho | |
| 2016/0328686 A1 | 11/2016 | Shimura et al. | |
| 2017/0092054 A1 | 3/2017 | Petersen et al. | |
| 2019/0051107 A1 | 2/2019 | Page et al. | |
| 2019/0197526 A1 | 6/2019 | Higgins et al. | |
| 2020/0152005 A1 | 5/2020 | Higgins et al. | |
| 2020/0302742 A1 | 9/2020 | Rutherford | |
| 2020/0410813 A1* | 12/2020 | Petersen | G07F 17/3288 |
| 2021/0110650 A1* | 4/2021 | Prabhaker | G06Q 50/34 |
| 2021/0150857 A1 | 5/2021 | Miri et al. | |
| 2022/0147957 A1 | 5/2022 | Newsom | |
| 2022/0148377 A1* | 5/2022 | Cleveland | G07F 17/3237 |
| 2023/0024728 A1 | 1/2023 | Higgins et al. | |
| 2023/0162564 A1 | 5/2023 | Petersen et al. | |
| 2023/0186722 A1 | 6/2023 | Warren et al. | |
| 2023/0196876 A1 | 6/2023 | Shepherd et al. | |
| 2023/0282064 A1 | 9/2023 | Shepherd et al. | |

OTHER PUBLICATIONS

"IM Series—Unattended Payment Modules," PAX Technology, copyright 2021, 2 pages.

"IM30 Unattended," PAX Technology, printed from https://www.pax.us/products/unattended-self-service/im30/, copyright 2023, 3 pages.

"Self Service—Unattended Payments for Every Industry Vertical," Ingenico, printed from https://ingenico.com/en/products-services/payment-terminals/self-service, printed on Dec. 17, 2023, 5 pages.

"Verifone UX 100/110—Self-Service at the Touch of a Button," Verifone, printed from https://www.verifone.com/en/devices/unattended/ux-100110, copyright 2023, 5 pages.

"Verifone UX410—Versatile Self-Service Solution for Contactless Payment," Verifone, printed from https://www.verifone.com/en/global/payment-devices/kiosks-unattended/ux410, copyright 2023, 18 pages.

* cited by examiner

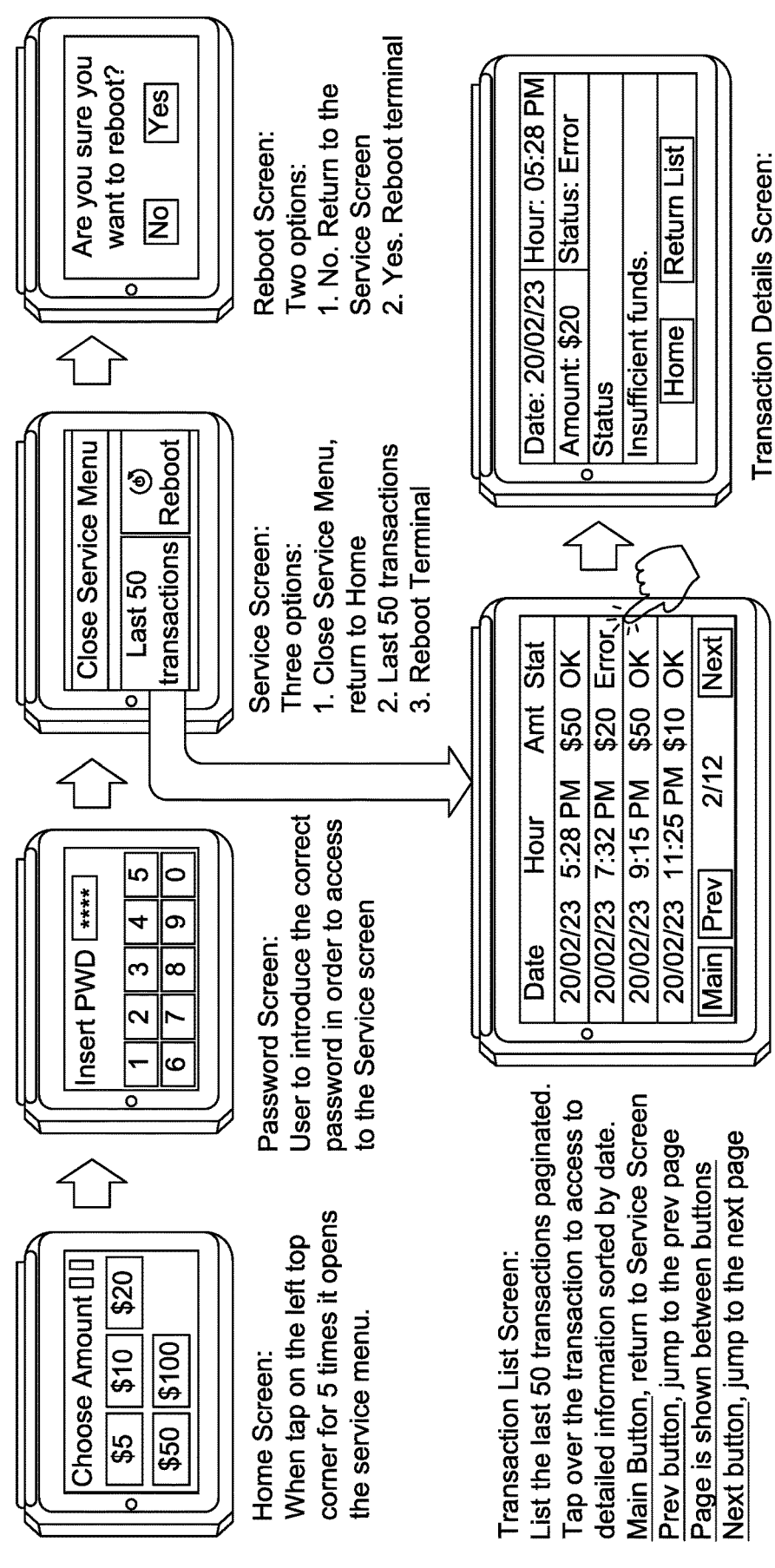

FIG. 5B

Home Screen:
When tap on the left top corner for 5 times it opens the service menu.

Password Screen:
User to introduce the correct password in order to access to the Service screen Service Screen:
Three options:
1. Close Service Menu, return to Home
2. Last 50 transactions
3. Reboot Terminal Reboot Screen:
Two options:
1. No. Return to the Service Screen
2. Yes. Reboot terminal Transaction List Screen:
List the last 50 transactions paginated.
Tap over the transaction to access to detailed information sorted by date.
Main Button, return to Service Screen
Prev button, jump to the prev page
Page is shown between buttons
Next button, jump to the next page Transaction Details Screen:
Complete details for the transaction.
Home Button return to Service Screen
Return list button, return to the list in the same page where it was.

TRANSFERRING FUNDS BETWEEN AN ELECTRONIC GAMING MACHINE AND A FINANCIAL INSTITUTION ACCOUNT UTILIZING A CASHLESS PAYMENT TERMINAL

CROSS-REFERENCE TO RELATED APPLICATIONS

This application is related to the following commonly owned co-pending patent applications: U.S. application Ser. No. 18/544,845, entitled "TRANSFERRING FUNDS TO AN ELECTRONIC GAMING MACHINE FROM A FINANCIAL INSTITUTION ACCOUNT UTILIZING A CASHLESS PAYMENT TERMINAL"; U.S. application Ser. No. 18/544,889, entitled "TRANSFERRING FUNDS FROM AN ELECTRONIC GAMING MACHINE TO A FINANCIAL INSTITUTION ACCOUNT UTILIZING A CASHLESS PAYMENT TERMINAL"; U.S. application Ser. No. 18/544,962, entitled "SYNCHRONIZING STATES BETWEEN AN ELECTRONIC GAMING MACHINE AND A CASHLESS PAYMENT TERMINAL"; and U.S. application Ser. No. 18/545,032, entitled "RESPONSIBLE GAMING TRANSFERS OF FUNDS BETWEEN AN ELECTRONIC GAMING MACHINE AND A FINANCIAL INSTITUTION ACCOUNT UTILIZING A CASHLESS PAYMENT TERMINAL".

BACKGROUND

In various embodiments, the systems and methods of the present disclosure utilize a cashless payment terminal to transfer, in accordance with a funding source, funds between an electronic gaming machine and a financial institution account.

Gaming machines may provide players awards in primary games. Gaming machines generally require the player to place a wager of credits to activate the primary game. The award of credits may be based on the player obtaining a winning symbol or symbol combination and on the amount of the wager.

BRIEF SUMMARY

In certain embodiments, the present disclosure relates to an electronic gaming machine including a processor, and a memory device that stores a plurality of instructions. When executed by the processor responsive to an occurrence of a cashout event, the instructions cause the processor to determine a funding source of an amount of funds of a credit balance. When executed by the processor responsive to the determined funding source of the amount of funds of the credit balance being a financial institution account maintained by a financial institution, the instructions cause the processor to automatically communicate, to a cashless payment terminal, data associated with the amount of funds of the credit balance. In these embodiments, the cashless payment terminal operates with a payment gateway to cause, independent of any amounts of funds modifying any balances of any gaming establishment accounts, a transfer of the amount of funds of the credit balance to the financial institution account. When executed by the processor responsive to the determined funding source of the amount of funds of the credit balance being independent of the financial institution account maintained by the financial institution, the instructions cause the processor to enable a cashout of the amount of funds of the credit balance independent of the cashless payment terminal.

In certain embodiments, the present disclosure relates to an electronic gaming machine including a processor, and a memory device that stores a plurality of instructions. When executed by the processor responsive to a receipt, from a cashless payment terminal and independent of any amounts of funds modifying any balances of any gaming establishment accounts, of data associated with a first amount of funds transferred from a financial institution account maintained by a financial institution, the instructions cause the processor to increase a credit balance based on the first amount of funds, and disable a funding source different from the cashless payment terminal. When executed by the processor responsive to a receipt, from the funding source different from the cashless payment terminal, of data associated with a second amount of funds received independent of any financial institution account maintained by any financial institution, the instructions cause the processor to increase the credit balance based on the second amount of funds, and disable the cashless payment terminal.

In certain embodiments, the present disclosure relates to a method of operating an electronic gaming machine. Responsive to an occurrence of a cashout event, the method includes determining, by a processor, a funding source of an amount of funds of a credit balance. Responsive to the determined funding source of the amount of funds of the credit balance being a financial institution account maintained by a financial institution, the method includes automatically communicating, to a cashless payment terminal, data associated with the amount of funds of the credit balance. In these embodiments, the cashless payment terminal operates with a payment gateway to cause, independent of any amounts of funds modifying any balances of any gaming establishment accounts, a transfer of the amount of funds of the credit balance to the financial institution account. Responsive to the determined funding source of the amount of funds of the credit balance being independent of the financial institution account maintained by the financial institution, the method includes enabling, by the processor, a cashout of the amount of funds of the credit balance independent of the cashless payment terminal.

Additional features are described herein, and will be apparent from the following Detailed Description and the figures.

BRIEF DESCRIPTION OF THE SEVERAL VIEWS OF THE DRAWINGS

FIG. 5B is a series of screens displayed by a cashless payment terminal in association with an example process of investigating a dispute involving a cashless payment terminal facilitated transfer of funds between an electronic gaming machine and a financial institution account

DETAILED DESCRIPTION

Figure 1A:
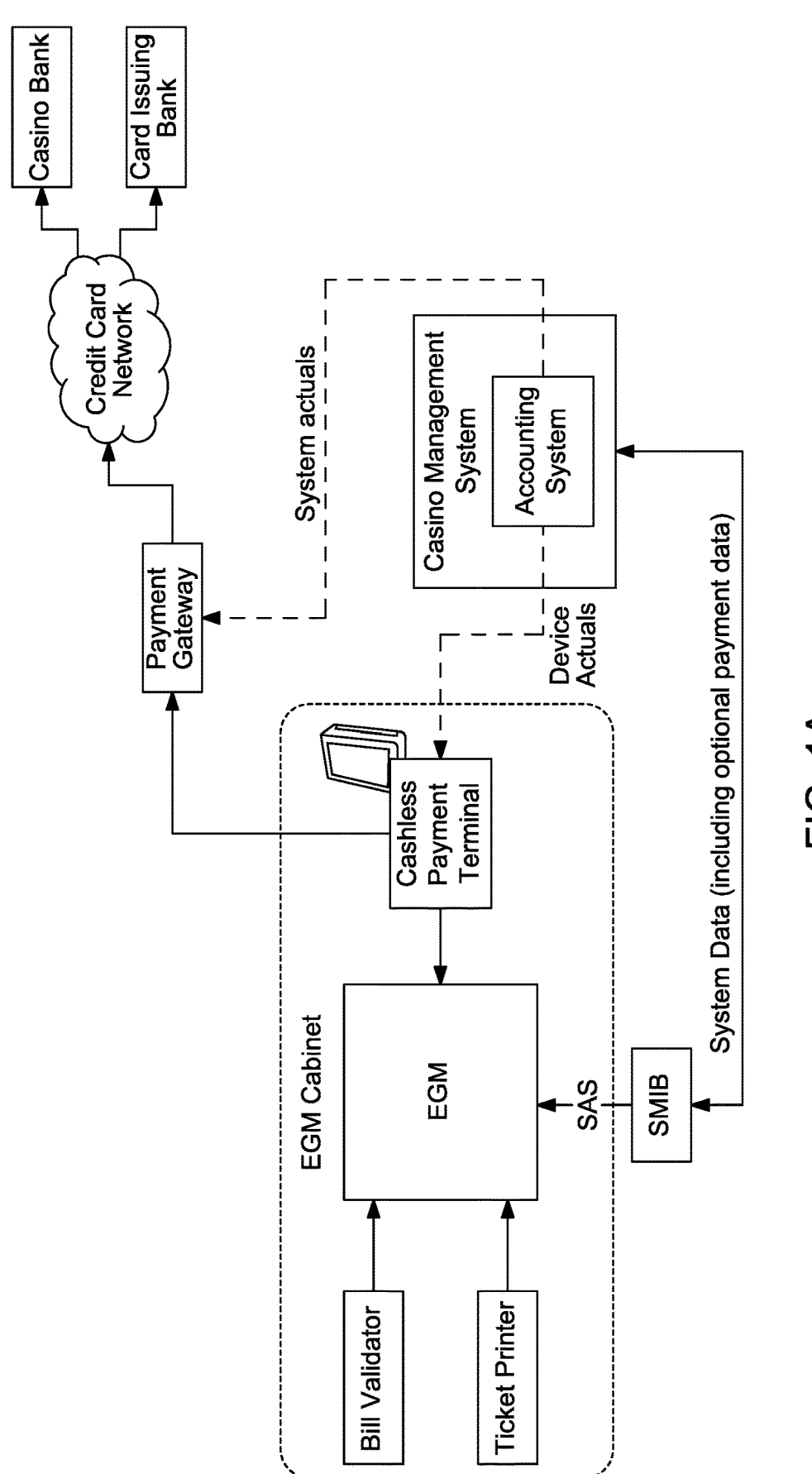
FIG. 1A is an example configuration of one embodiment of the architecture of a plurality of different components of the system of the present disclosure.

In various embodiments, the systems and methods of the present disclosure utilize a cashless payment terminal to transfer, in accordance with a funding source, funds between an electronic gaming machine and a financial institution account.

In certain embodiments, the system of the present disclosure integrates or otherwise associates a cashless payment terminal with an electronic gaming machine to enable a movement of funds between the electronic gaming machine and a financial institution account maintained by a financial institution and accessible via the cashless payment terminal. In certain of these embodiments, the movement of funds occurs independent of any gaming establishment accounts maintained by a gaming establishment fund management system such that a user of the electronic gaming machine does not have to register for any gaming establishment accounts to transfer funds to and/or from the electronic gaming machine. That is, rather than requiring a user to take the time to establish a gaming establishment account, such as a cashless wagering account, with a gaming establishment to receive (and/or send) fund transfers from (and/or to) a financial institution account maintained by a financial institution and then take additional time to transfer funds between the gaming establishment account and an electronic gaming machine, the system of the present disclosure utilizes a cashless payment terminal associated with the electronic gaming machine and operating with a payment gateway to enable a user to directly transfer funds between the financial institution account and the electronic gaming machine.

In certain embodiments, the system of the present disclosure utilizes a cashless payment terminal integrated with an electronic gaming machine and operating with a payment gateway to facilitate the direct transfer of funds from a financial institution account to a credit balance of the electronic gaming machine. In operation of certain such embodiments, a user interfaces with a cashless payment terminal integrated with an electronic gaming machine to at least select an amount of funds to be transferred to a credit balance of the electronic gaming machine and present a payment instrument, such as a debit card or credit card associated with a financial institution account and operable with a network payment processor. Following such interactions, the cashless payment terminal operates, via a payment gateway, with a component of a financial institution that maintains the financial institution account (e.g., a banking server) to request the amount of funds to be transferred to the credit balance of the electronic gaming machine. If the component of the financial institution authorizes the requested amount of funds from the financial institution account, the component of the financial institution operates, via the payment gateway, with the cashless payment terminal to transfer (or designate for transfer) the requested amount of funds to the credit balance of the electronic gaming machine. In certain such embodiments, the cashless payment terminal and/or the payment gateway impose certain limits, such as responsible gaming limits and/or anti-money laundering limits, on such transfers. Accordingly, certain embodiments of the present disclosure utilize a cashless payment terminal operating with a payment gateway to facilitate the transfer of funds from a financial institution account to a credit balance of an electronic gaming machine independent of such funds being transferred to any gaming establishment accounts (and thus saves users time and effort in having to set up such a gaming establishment account as well as save processing resources by reducing the quantity of accounts such funds have to travel to before reaching an electronic gaming machine).

In addition to utilizing a cashless payment terminal integrated with an electronic gaming machine to facilitate the direct transfer of funds from a financial institution account to a credit balance of the electronic gaming machine, in certain additional or alternative embodiments, the system of the present disclosure utilizes a cashless payment terminal integrated with an electronic gaming machine to facilitate the direct transfer of funds from a credit balance of the electronic gaming machine to a financial institution account. In operation of certain such embodiments, following a user interfacing with an electronic gaming machine to request a cash out of an amount of funds from a credit balance of the electronic gaming machine to a financial institution account, the cashless payment terminal operates, via a payment gateway, with a component of a financial institution that maintains the financial institution account to transfer (or designate to transfer) the amount of funds of the credit balance of the electronic gaming machine to the financial institution account. In certain embodiments, independent of a user requesting the amount of funds of the credit balance of the electronic gaming machine to be transferred to the financial institution account, if the electronic gaming machine determines that at least part of the funds of the credit balance of the electronic gaming machine were sourced from a financial institution account, then to remain in compliance with certain anti-money laundering regulations, the electronic gaming machine automatically requests the cashless payment terminal to return such funds to the financial institution account upon a cashout event at the electronic gaming machine. As such, certain embodiments of the present disclosure utilize a cashless payment terminal operating with a payment gateway to facilitate the transfer of funds from a credit balance of an electronic gaming machine to a financial institution account independent of such funds being transferred to any gaming establishment accounts (and thus saves users time and effort in having to set up such a gaming establishment account as well as save processing resources by reducing the quantity of accounts such funds have to travel to before reaching the financial institution account).

Accordingly, various components of the present disclosure operate individually or collectively to enable funds to be transferred, in real time, between an electronic gaming machine and a financial institution account using a payment instrument issued by a financial institution that maintains the financial institution account. Such a transfer occurs without the need to utilize a gaming establishment account (e.g., a cashless wagering account) as an intermediary and thus avoids having to wait for any fund transfers to the gaming establishment account to be completed or alternatively having to pay various surcharge fees to expedite any fund transfers to the gaming establishment account. That is, unlike prior systems that required a certain amount of time, such as up to three days, to transfer funds from a banking account to a gaming establishment account (for the funds to then be transferred to an electronic gaming machine for use) or to transfer funds from a credit balance of an electronic gaming machine to a gaming establishment account and then to a banking account (to become available for use via a payment instrument associated with the banking account), the present disclosure employs a cashless payment terminal integrated with an electronic gaming machine to bypass these relatively timely transfers and enable the cashless payment terminal to interact, in real time and via a payment gateway, with a computing device of a banking institution (i.e., a financial institution) to transfer funds between a banking account and a credit balance of the electronic gaming machine. As such, the system of the present disclosure offers the benefits of payment instrument transactions without certain of the fund transfer friction previously encountered by users transferring funds between a gaming establishment account and a banking account. Such a configuration provides the user greater control over their funds and, in certain instances, enables a user to avoid having to register for a gaming establishment account to transfer funds to and/or from a banking account.

It should thus be appreciated that the integration of a cashless payment terminal with an electronic gaming machine facilitates a more cashless environment which decreases certain security concerns associated with cash and/or reduces certain fees associated with procuring cash. For example, integrating a cashless payment terminal with an electronic gaming machine to fund a gaming session at the electronic gaming machine with funds transferred from a banking account provides that cash does not need to be withdrawn from a financial institution account, such as using an automated teller machine that, in exchange for a relatively high fee, dispenses an amount of cash that is either withdrawn from a financial institution account (if a banking debit card is inserted or swiped into a card reader of the automated teller machine) or advanced from a credit account (if a credit card is inserted or swiped into a card reader of the automated teller machine) and then brought to an electronic gaming machine. In this example, the reduction of the usage of cash increases safety (e.g., minimizing users having to carry large sums of cash and minimizing such cash being a vehicle to spread potentially harmful contagions).

It should be further appreciated that the integration of a cashless payment terminal with an electronic gaming machine facilitates a more ticketless environment which decreases certain security concerns associated with cashless ticket vouchers and/or reduces certain infrastructure requirements associated with processing cashless ticket vouchers. For example, integrating a cashless payment terminal with an electronic gaming machine to cashout funds from the electronic gaming machine to a banking account minimizes instances of the electronic gaming machine converting the credits remaining on the credit balance of the electronic gaming machine to a cash value which the electronic gaming machine then outputs, via a printer, as a cashless ticket voucher (i.e., a bearer instrument redeemable for cash or game play on an electronic gaming machine). By way of background, while the utilization of cashless ticket vouchers decreases certain known problems previously associated with electronic gaming machines that dispensed coins or cash, the utilization of cashless ticket vouchers is still associated with various infrastructure, such as incurred labor and material costs. For example, the utilization of cashless ticket vouchers is associated with the labor costs of having to periodically remove a cash box including received cashless ticket vouchers (and/or cash) from the electronic gaming machine, replace the removed cash box with an empty one and refill the blank cashless ticket voucher stacks housed by the electronic gaming machine. The utilization of such cashless ticket vouchers is further associated with the various labor costs of counting the cashless ticket vouchers (and/or cash) removed from the electronic gaming machine. Specifically, any removed cashless ticket vouchers (and/or cash) are transported to a secure area where one or more individuals are involved in counting and recording the various cashless ticket vouchers (and/or sums of cash) removed from each electronic gaming machine. The amounts removed from each electronic gaming machine are reconciled with other information sources, such as from hard meters on the electronic gaming machine or records from a server that generates and validates cashless ticket vouchers. The reconciliation process increases the tracking of the earnings from the electronic gaming machine for taxation purposes. From a security standpoint, the utilization of such cashless ticket vouchers typically requires that a technician and one or more security providers are involved in operations where cash is removed from an electronic gaming machine. The security providers track the cashless ticket vouchers (and/or cash) being retrieved and transported to deter theft. Additionally, since removing cashless ticket vouchers (and/or cash) requires the electronic gaming machine cabinet to be opened, the security providers observe the operation to reduce the occurrence of tampering with the electronic gaming machine hardware. Against this background, it should be appreciated that since the cashless payment terminal integrated with the electronic gaming machine of the present disclosure enables funds to be transferred from a credit balance of the electronic machine to a banking account without the need to issue any cashless ticket vouchers, these security concerns and infrastructure requirements associated with the reconciliation of cashless ticket vouchers is minimized (and/or eliminated).

In various embodiments, the present disclosure is directed to a system including various components that operate to facilitate a transfer of funds between a financial institution account and an electronic gaming machine ("EGM") including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities). In such embodiments, the system employs a cashless payment terminal ("CPT") operating with a payment gateway to facilitate, independent of any physical currency or cashless ticket vouchers, a transfer of funds, such as via a transfer of fund data, between a financial institution account and an EGM associated with the CPT. It should be appreciated that while the below-described embodiments pertain to utilizing a CPT operating with a payment gateway to transfer funds between a financial institution account and an EGM without utilizing any physical forms of currency, such embodiments may additionally or alternatively pertain to utilizing a CPT operating with a payment gateway to transfer, without utilizing any physical forms of currency, funds between a financial institution account and another gaming device, such as an electronic gaming table or a component associated with a table configured to enable a play of a table game or a non-gaming device, such as a cashless ticket voucher kiosk.

In certain embodiments in which a payment instrument employed to access funds in a financial institution account takes the form of a card, such as a debit card or a credit card, the CPT includes a card reader configured to read the encoded information contained on various magnetic stripes of various cards associated with the user. In another embodiment, the CPT includes a card reader configured to read various information stored by various smart cards or integrated circuit cards associated with the user. In another such embodiment, the CPT includes a card reader configured to read the encoded information contained on various magnetic stripes of various cards associated with the user as well as read various information stored by various smart cards or integrated circuit cards associated with the user. In these embodiments, the card reader of the CPT is capable of identifying information associated a plurality of different cards or types of cards from a plurality of different systems, such as one or more financial institution systems, one or more gaming establishment patron management systems (e.g., player tracking systems), and/or one or more gaming establishment fund management systems (e.g., cashless wagering account systems). In different embodiments, the payment instrument, such as a financial institution card, associated with the user takes the form of one or more of a smart card that stores account information, a magnetic striped card that stores account information, a smart card that does not store any account information but is associated with a card number that is associated with account information in one or more maintained databases, and/or a magnetic striped card that does not store any account information but is associated with a card number that is associated with account information in one or more maintained databases.

In another embodiment, the CPT includes a plurality of card readers which are each configured to read information associated with one or more different systems. In this embodiment, for security reasons, different systems are required to be maintained separately such that different card readers are needed to access information for each system. In one such embodiment, the CPT includes a first card reader configured to read the encoded information contained on a magnetic stripe of one or more cards of the user associated with one or more systems. In this embodiment, the CPT includes a second card reader configured to read the encoded information contained on a magnetic stripe of one or more different cards of the user associated with one or more different systems.

In another embodiment, the CPT includes a first card reader configured to read the information stored by one or more smart cards or integrated circuit cards associated with the user and one or more systems. In this embodiment, the CPT includes a second card reader configured to read the information stored by one or more smart cards or integrated circuit cards associated with the user and one or more different systems. In another such embodiment, the CPT includes a plurality of hybrid card readers which are each configured to read the encoded information contained on one or more magnetic stripes of one of more of the user's cards associated with one or more systems as well as read various information stored by various smart cards or integrated circuit cards of the user associated with one or more different systems.

In another such embodiment, the CPT additionally or alternatively includes one or more card readers which support one or more contactless payment systems, such as a mobile payment solutions facilitated by a mobile device or a contactless card system facilitated by a credit card, debit card, smart card, such as using Apple Pay™ or Android Pay™.

In certain embodiments in which a payment instrument employed to access funds in a financial institution account takes the form of one or more financial institution applications running or being executed on a mobile device, the CPT additionally or alternatively includes at least one wireless interface which is configured to facilitate the communication of information between the CPT and a mobile device. It should be appreciated that the CPT is configured to communicate with one or more mobile devices utilizing one or more wireless communication protocols including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol). In these embodiments, the information associated with a payment instrument, such as a financial institution card, is stored in association with one or more financial institution mobile device applications wherein the CPT is configured to communicate, via the wireless, interface, with such financial institution mobile device applications to retrieve this information without the need of a physical financial institution card. In different embodiments, the payment instrument, such as a financial institution card, associated with the user takes the form of one or more of a mobile device application that stores account information, and/or a mobile device application that does not store any account information but is associated with a card number that is associated with account information in one or more maintained databases.

In certain embodiments, the CPT additionally or alternatively includes at least one user authentication device such as a secure personal identification number ("PIN") pad, or a biometric identifier associated with one or more biometric sensors.

In certain embodiments, the CPT includes one or more display devices configured to display information, including one or more messages, to the user. In certain such embodiments, to prolong the lifespan of the CPT (and to reduce power consumption), the display device of the CPT (and, in certain instances, the CPT itself), enters a power-save mode when in certain states. For example, when deposits or cashouts are not currently permitted at the EGM, the CPT disables itself (or disables an associated touchscreen of the CPT). In another example (as explained in more detail below), when an EGM becomes disabled or is in a tilt condition, the CPT disables the display device of the CPT until interacted with by a player or staff of a casino operator. In another example, when the EGM is currently playing a game, the CPT disables an associated touchscreen of the CPT until interacted with by a player or staff of the casino operator.

In certain embodiments, the CPT includes an Ethernet port to connect to and communicate data with the payment gateway. In certain embodiments, to eliminate the increase in Ethernet switch port density required to support each CPT having its own Ethernet network connect, the EGM additionally or alternatively exposes (either directly, or indirectly via a USB to Ethernet port) an Ethernet port that a cable from the CPT can be plugged into. In these embodiments, the EGM tunnels all Ethernet communications from the CPT to the EGM's own Ethernet connection (thereby only requiring one Ethernet port per EGM). It should be appreciated that such a configuration may require the CPT to authenticate itself to the EGM, such performing an 802.1X authentication and/or a Point-to-Point Protocol over Ethernet ("PP-PoE") authentication, to enable the EGM to tunnel the Ethernet of the CPT through the EGM's own Ethernet connection.

In certain embodiments, the CPT additionally or alternatively includes a network interface to communicate with a master gaming controller of the EGM and/or a CPT host system (e.g., a server operable to monitor one or more CPTs associated with one or more EGMs). For example, the CPT includes a communication interface operable to serially communicate, in accordance with a slot accounting system ("SAS") protocol and/or a game to system ("G2S") protocol, data with the master gaming controller of the EGM. In different embodiments, the network interface enables the CPT to communicate data with the EGM, the CPT host system (and/or the payment gateway) via any suitable wired and/or wireless communication interface having different architectures and utilizing a variety of gaming protocols (e.g., SAS and/or G2S) and/or non-gaming protocols.

In certain embodiments, the housing of the EGM supports a housing of the CPT. In certain other embodiments, the CPT is supported independent of the housing of the EGM.

In certain embodiments, the system operates in a gaming establishment environment in which each EGM is associated with certain gaming establishment management system in-game hardware, such as a slot machine interface board ("SMIB") that operates with one or more components of the gaming establishment management system, such as one or more components of a gaming establishment accounting system. In these embodiments, to reconcile data associated with one or more fund transfers involving one or more financial institution accounts, the CPT and the one or more components of the gaming establishment management system, such as one or more components of a gaming establishment accounting system, are in communication with the payment gateway. For example, as seen in FIG. 1A, in certain embodiments, the EGM master controller is in communication with a SMIB which is in communication with the casino management system (including at least the casino accounting system). In this example, the EGM master controller is also in communication with the CPT which is in communication with the casino management system (including at least the casino accounting system). In this example, both the CPT and the casino management system (including at least the casino accounting system) are in communication with the payment gateway which is in communication, via a banking network, with one or more banks or other financial institutions, such as a card issuing bank (i.e., a financial institution that maintains one or more financial institution accounts associated with a payment instrument of a user) and/or a casino bank (i.e., a financial institution that maintains one or more financial institution accounts for a casino).

Figure 1B:
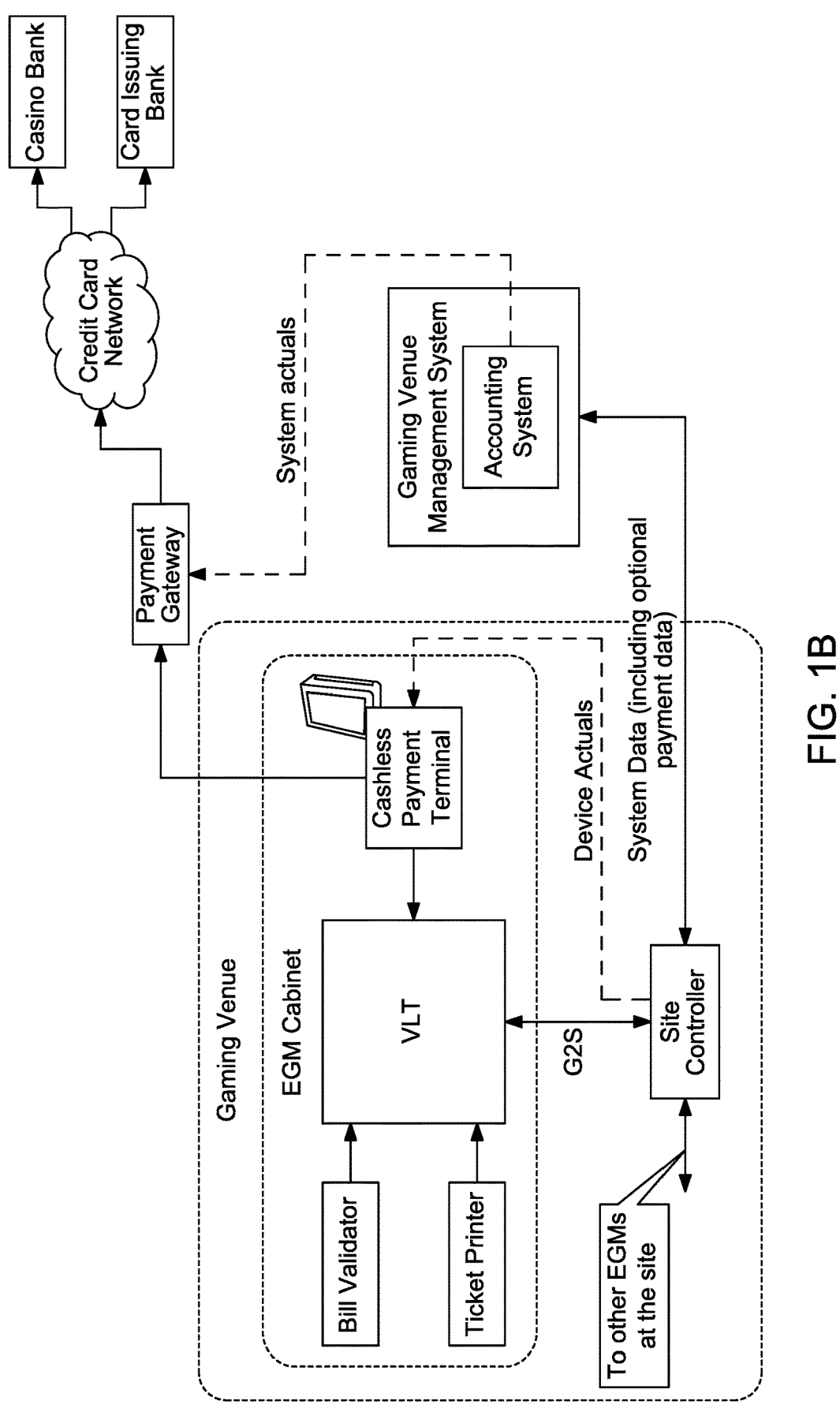
FIG. 1B is an example configuration of another embodiment of the architecture of a plurality of different components of the system of the present disclosure.

In certain embodiments in which the EGM is a video lottery terminal, the system operates in an environment in which certain gaming establishment management system in-game hardware, such as a SMIB, is not required for each video lottery terminal. In these embodiments, each video lottery terminal operates with a site controller which is in communication with the CPT and one or more components of the gaming establishment management system, such as one or more components of a gaming establishment accounting system. In these embodiments, to reconcile data associated with one or more fund transfers involving one or more financial institution accounts, the CPT and the one or more components of the gaming establishment management system, such as one or more components of a gaming establishment accounting system, are in communication with the payment gateway. For example, as seen in FIG. 1B, in certain embodiments, the video lottery terminal master controller is in communication with a site controller which is in communication with the gaming venue management system (including at least the casino accounting system). In this example, the video lottery terminal master controller is also in communication with the CPT. As further seen in FIG. 1B, both the CPT and the gaming venue management system (including at least the casino accounting system) are in communication with the payment gateway which is in communication, via a banking network, with one or more banks or other financial institutions, such as a card issuing bank (i.e., a financial institution that maintains one or more financial institution accounts associated with a payment instrument of a user) and/or a casino bank (i.e., a financial institution that maintains one or more financial institution accounts for a casino).

Figure 1C:
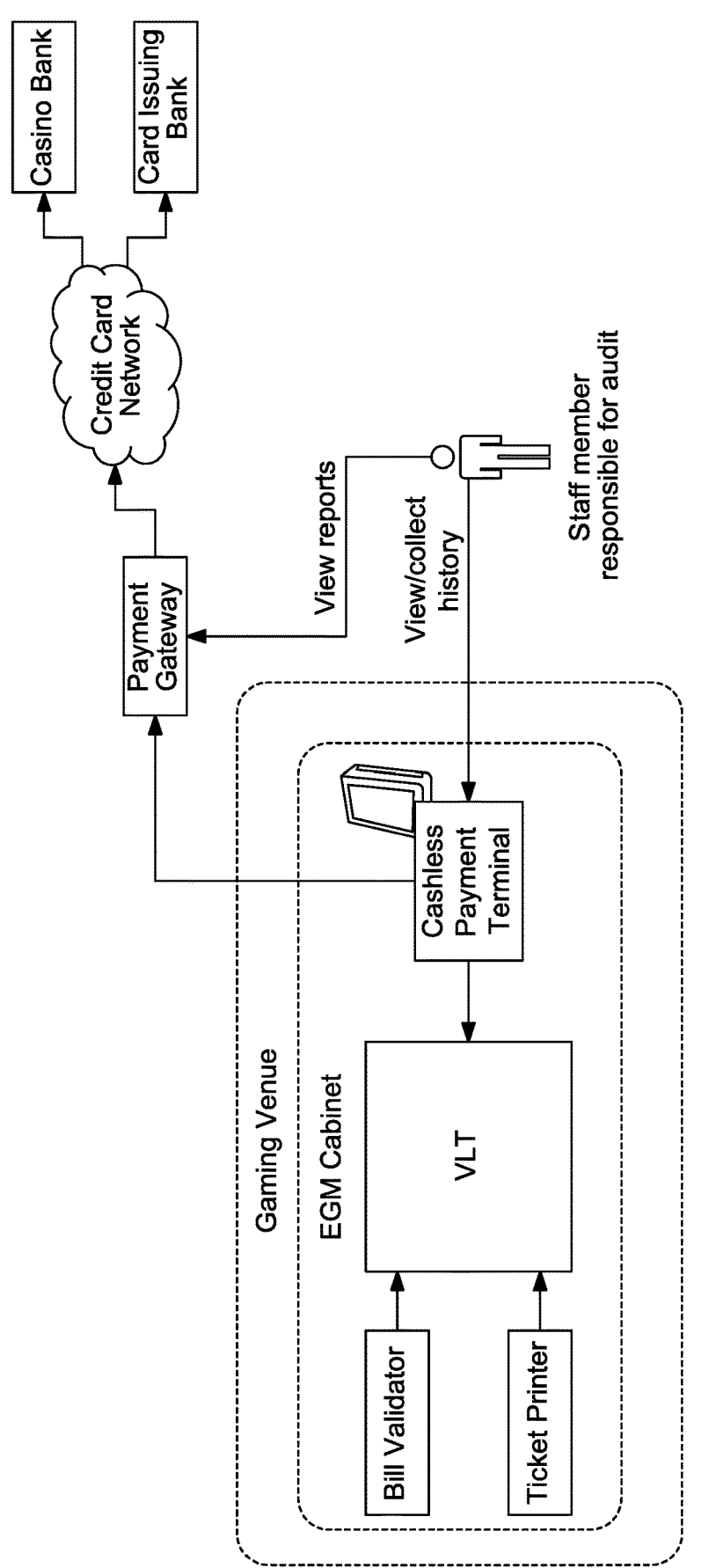
FIG. 1C is an example configuration of another embodiment of the architecture of a plurality of different components of the system of the present disclosure.

In certain other embodiments in which the EGM is a video lottery terminal, the system operates in an environment without any gaming establishment management system components. In these embodiments, each video lottery terminal operates with a CPT (in communication with a payment gateway) independent of any components of any gaming establishment management system, such as any components of any gaming establishment accounting system. Rather, in these stand-alone configurations, to reconcile data associated with one or more fund transfers involving one or more financial institution accounts, the CPT and/or the payment gateway are accessible by gaming establishment personnel, such as a casino staff member responsible for conducting an audit. For example, as seen in FIG. 1C, in certain embodiments, the video lottery terminal master controller is in communication with the CPT. In this example, the CPT is in communication with the payment gateway which is in communication, via a banking network, with one or more banks or other financial institutions, such as a card issuing bank (i.e., a financial institution that maintains one or more financial institution accounts associated with a payment instrument of a user) and/or a casino bank (i.e., a financial institution that maintains one or more financial institution accounts for a casino).

Figure 2A:
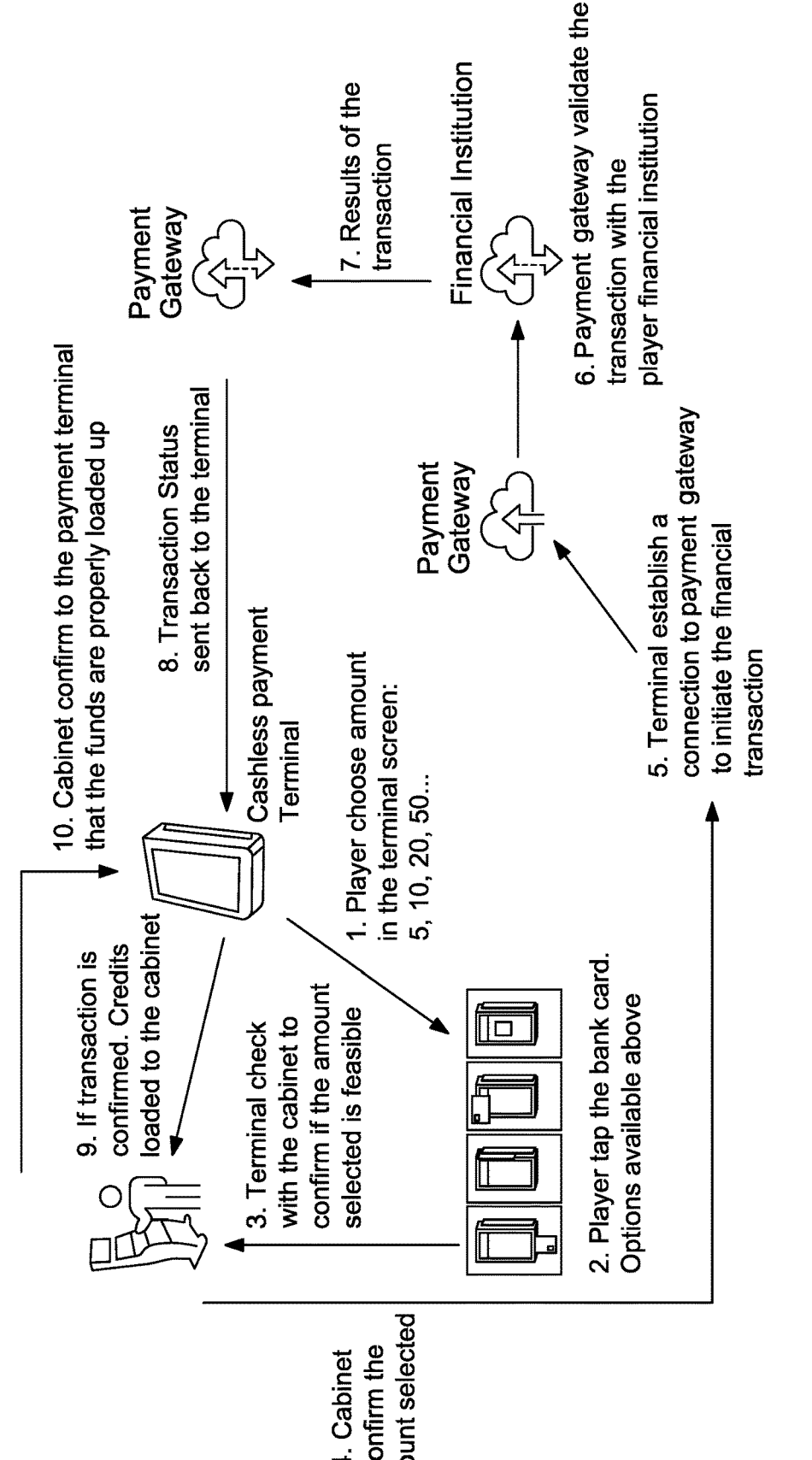
FIG. 2A is a flow chart of an example process of initiating, at a cashless payment terminal, a transfer that results in funding a credit balance of an electronic gaming machine with an amount of funds from a financial institution account.
Figure 2B:
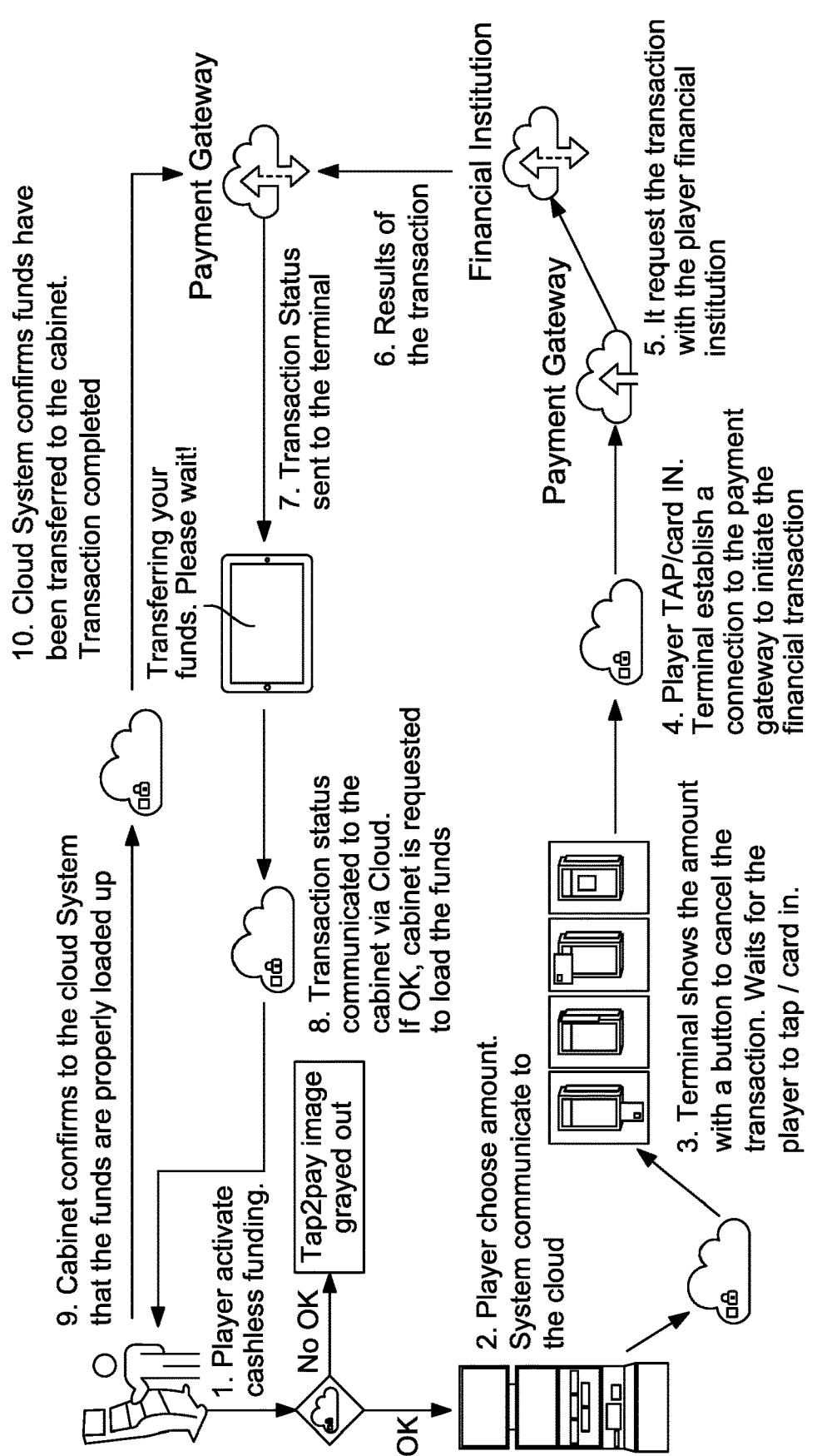
FIG. 2B is a flow chart of an example process of initiating, at an electronic gaming machine, a transfer that employs a cashless payment terminal to fund a credit balance of the electronic gaming machine with an amount of funds from a financial institution account.

In certain embodiments, the system of the present disclosure utilizes a CPT integrated with an EGM and operating with a payment gateway to facilitate the transfer of funds from a financial institution account to a credit balance of the EGM. For example, as seen in FIG. 2A, upon a user, such as a player, interfacing with the CPT to initiate a transfer of a selected amount of funds from a financial institution account to a credit balance of the EGM, the user causes a payment instrument, such as a bank card associated with a financial institution account, to engage a card reader of a CPT. In another example, as seen in FIG. 2B, upon a user, such as a player, interfacing with the EGM (e.g., via a service window and/or a menu option available) to initiate a transfer of a selected amount of funds from a financial institution account to a credit balance of the EGM, following a direct or indirect (e.g., cloud-based) communication of data between the EGM and the CPT, the user interfaces with the CPT and causes a payment instrument, such as a bank card associated with a financial institution account, to engage a card reader of the CPT.

In certain embodiments in which the user intends to withdraw funds from a financial institution banking account, a bank card associated with a financial institution account includes a debit card which the user inserts into or otherwise swipes by a card reader of the CPT. In certain embodiments, in which the user intends to receive an advance of funds from a financial institution credit account, the bank card associated with a financial institution account includes a credit card which the user inserts into or otherwise swipes by a card reader of the CPT.

In certain embodiments, following the engagement of the bank card associated with the financial institution account with the card reader of the CPT, the CPT reads the information associated with the financial institution account to identify the user, the financial institution and/or the financial institution account. Specifically, one or more processors of the CPT executing one or more sets of instructions stored by one or more memory devices of the CPT operates with the card reader of the CPT to identify relevant information associated with the user which is stored on or otherwise indicated by the swiped or inserted financial institution card. In certain embodiments, if the CPT is unable to read the information associated with the financial institution account and/or following a check with the EGM of the amount of funds to be transferred, the EGM indicates that the amount of funds is not feasible (e.g., the amount of funds would cause a credit balance of the EGM to exceed a maximum credit balance), the CPT displays one or more error messages to the user, such as an error message prompting the user to reswipe or reinsert their financial institution card or change the requested amount of funds.

In certain embodiments, following zero, one or more prompts to the user, the user authenticates themselves utilizing one or more user authentication devices of the CPT. For example, the CPT prompts the user to utilize the secure PIN pad to enter a PIN which is used by the CPT to verify that the user is the legitimate owner of the swiped or inserted card. In certain embodiments, if the CPT is unable to authenticate the user, the CPT displays one or more error messages to the user, such as an error message instructing the user to enter different authenticating information. In certain embodiments, after displaying a designated quantity of error messages, after a designated period of time without a response from the user, or after a designated quantity of failed attempts to authenticate the user, the CPT cancels or otherwise aborts the transaction.

In certain embodiments in which the payment instrument take the form of a mobile device application, following the activation of a wireless interface of the CPT, the CPT receives, from a mobile device, data associated with the financial institution account to identify the user, the financial institution and/or the financial institution account. In operation of these embodiments, following the activation of the wireless interface of the CPT, the CPT displays one or more messages informing the user to activate or launch an application on the mobile device and to then cause the mobile device to tap or otherwise engage a designated portion of the CPT (or otherwise place the mobile device a designated distance from a designated portion of the CPT). In certain embodiments, if the user fails to activate or launch the application on the mobile device and/or fails to cause the mobile device to tap or otherwise engage a designated portion of the CPT (or otherwise place the mobile device a designated distance from a designated portion of the CPT), the CPT displays one or more error messages or reminder messages to the user. In certain embodiments, after displaying a designated quantity of error or reminder messages or after a designated period of time without a response from the user, the CPT cancels or otherwise aborts the transaction.

In certain embodiments, an engagement between the mobile device and the CPT causes a pairing or linkage to occur between the mobile device (and specifically one or more applications being run or executed on the mobile device) and the CPT. In such embodiments, after the user causes the mobile device to engage the CPT (e.g., the player taps the mobile device to a card reader or other designated location(s) of the CPT) and a pairing or linkage between the mobile device (and specifically one or more applications being run or executed on the mobile device) and the CPT occurs, the application being run or executed on the mobile device prompts the user to confirm the transfer of the amount of funds from the financial institution account to the EGM.

In certain embodiments, following a valid authentication by the user (or a determination that no authentication by the user is required) and/or a confirmation from the EGM that the amount of funds to be transferred to the EGM is feasible, as seen in FIGS. 2A and 2B, the CPT communicates, via an established connection (e.g., a direct connection between the EGM and the CPT or an indirect connection, such as a cloud-based connection in which both the EGM and the CPT communicate with a cloud system that facilitates the communication between the EGM and the CPT), data to a payment gateway to initiate the requested financial transaction with the financial institution. Such a requested financial transaction includes the financial institution determining if the user inputted amount of funds are available to be transferred from the financial institution account associated with the presented payment instrument. Specifically, one or more processors of the CPT executing one or more sets of instructions stored by one or more memory devices of the CPT communicates data to the payment gateway which communicates part or all of such data to one or more financial institution servers to confirm an availability of funds to be transferred. In these embodiments, if the CPT is unable to confirm that the user inputted amount of funds are available to be transferred from the financial institution, the CPT displays one or more error messages to the user, such as an error message instructing the user to input another amount of funds. In certain embodiments, after displaying a designated quantity of error messages, after a designated period of time without a response from the user, or after a designated quantity of a user inputting unavailable amounts of funds to be transferred, the CPT cancels or otherwise aborts the transaction.

In certain embodiments, after confirming that the requested amount of funds are available for transfer and the financial institution authorizing a decrease (or a designation to decrease) the balance of the financial institution account via an original credit transaction, an account funding transaction, and/or an electronic funds transfer, as further seen in FIGS. 2A and 2B, the CPT operates with the EGM to modify the credit balance of the EGM based on the requested amount of funds. In certain such embodiments, one or more processors of the CPT execute one or more sets of instructions stored by one or more memory devices to operate with the master gaming controller of the EGM to complete the transfer of funds or fund data to the EGM. Such a transfer of funds or fund data includes the EGM updating the credit balance of the EGM to account for the amount of funds authorized from the financial institution account. Following the completed transfer of funds or fund data to the EGM, the CPT communicates one or more completed transaction confirmations. In certain embodiments, the CPT communicates, via the payment gateway, a completed transaction confirmation to the financial institution.

Figure 3A:
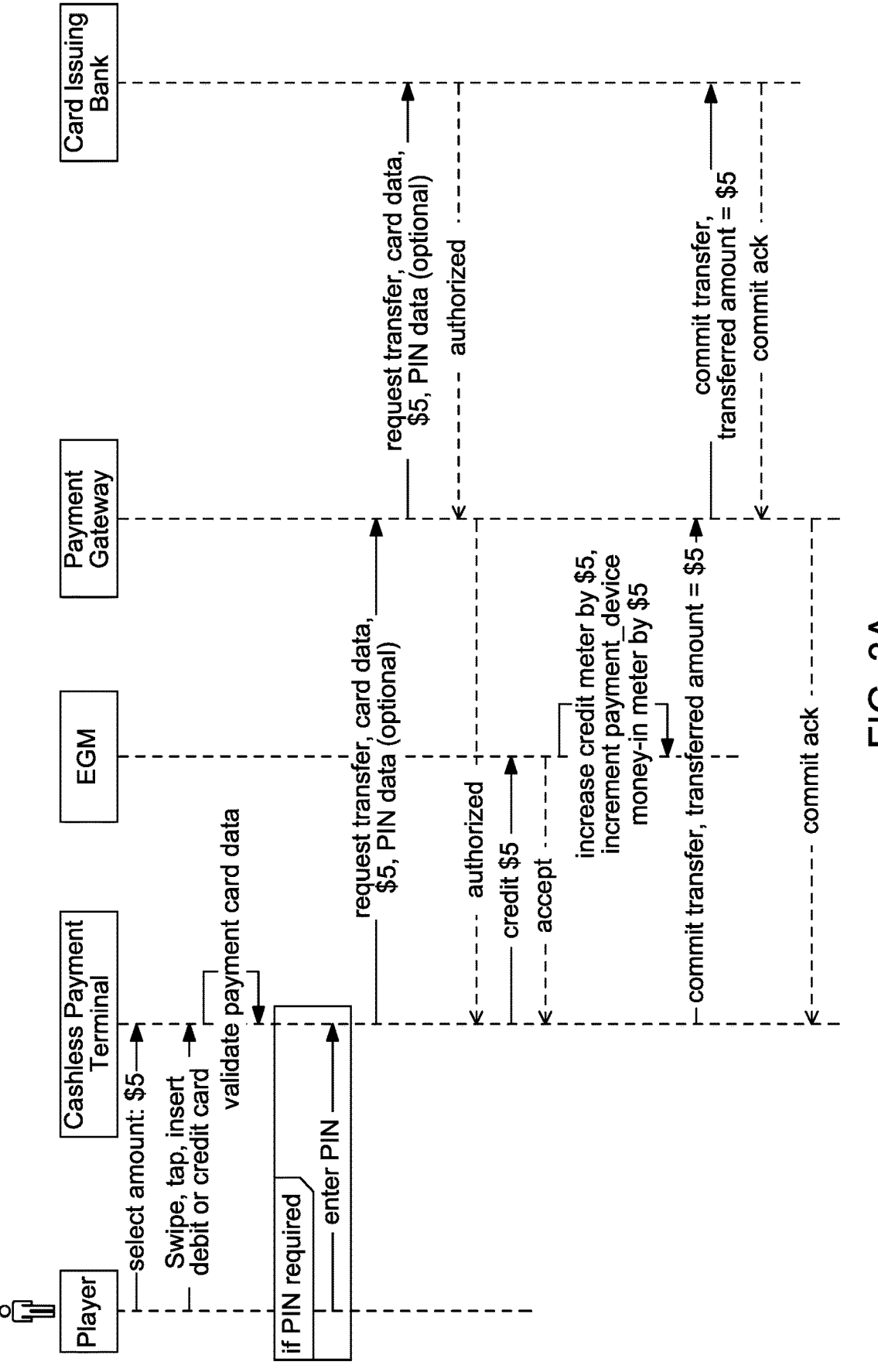
FIGS. 3A and 3B are flow charts of example processes of employing a cashless payment terminal to fund a credit balance of an electronic gaming machine with an amount of funds from a financial institution account.

Accordingly, in certain embodiments, the CPT operates with the payment gateway to form the connection between the financial institution and the EGM necessary to facilitate the CPT initiated transfer of funds or fund data from the financial institution to the EGM. For example, as seen in FIG. 3A (which illustrates the described interactions between a player, the CPT, the EGM, the payment gateway and the financial institution that maintains the financial institution account which funds are transferred from), certain embodiments enable a player to interact with the CPT to select an amount of funds to transfer from a financial institution account associated with a payment instrument presented to the CPT. In this example, the CPT proceeds to operate, via the payment gateway, with the financial institution (i.e., the card issuing bank) to request the amount of funds from the financial institution account. In this example, if the financial institution authorizes the requested amount of funds, the CPT operates with the EGM to increase the credit meter of the EGM by the requested amount of funds. It should be appreciated that as seen in this example, the CPT operates with a payment gateway to facilitate the transfer of funds from the financial institution account to a credit balance of the EGM independent of such funds being transferred to any gaming establishment accounts, such as any cashless wagering accounts, which results in saving users time and effort in having to set up such a gaming establishment account as well as saving processing resources by reducing the quantity of accounts such funds have to travel to before reaching the EGM.

In certain embodiments, following the funding of the credit balance of the EGM with funds directly from a financial institution account (and independent of any gaming establishment account), the CPT generates a receipt memorializing the transaction. In these embodiments, following the completion of a transaction that results in increasing a credit balance of an EGM with funds from a financial institution account, such as a bank account, one or more components communicate a completed transaction confirmation to the user. For example, as seen in FIG. 3B (which illustrates the described interactions between a player, the CPT, the EGM, the payment gateway, the EGM ticket printer and the financial institution that maintains the financial institution account which funds are transferred from), certain embodiments enable a player to interact with the CPT to transfer an amount of funds from a financial institution account associated with a payment instrument presented to the CPT to a credit meter of the EGM and cause a printer of the EGM to print a receipt of the transaction.

Figure 3B:
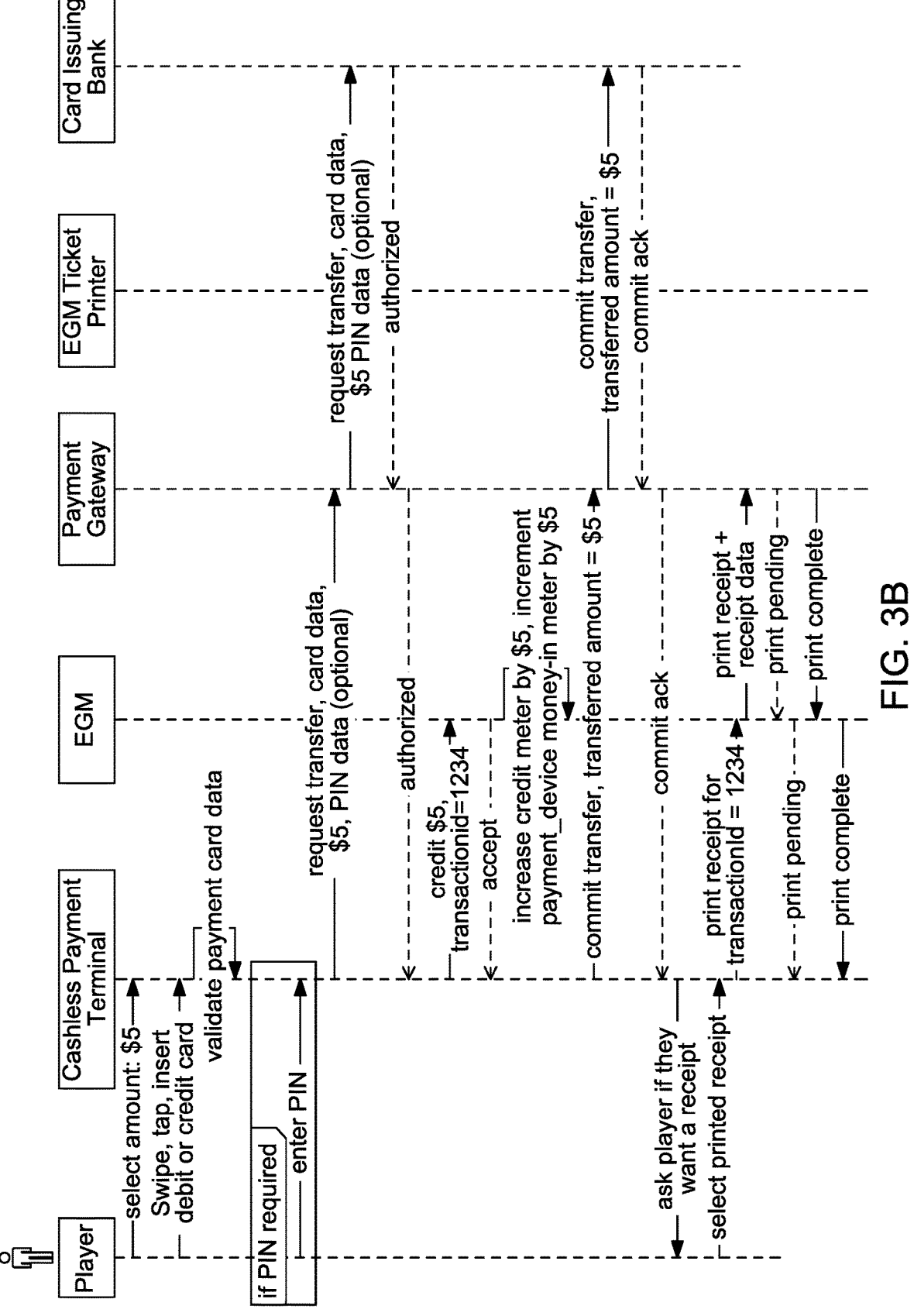

In certain embodiments, as seen in FIG. 3B, the CPT operates with a printer of the EGM to cause the printer of the EGM to print a receipt confirming the completed fund transfer transaction. In certain embodiments, the CPT includes a printer operable to print a receipt confirming the completed fund transfer transaction. In certain embodiments, the CPT enables the player to enter contact information, such as an email and/or mobile phone number, and the CPT (and/or EGM) electronically provides a receipt confirming the completed fund transfer transaction via an email and/or via an SMS or text message. In certain embodiments in which the payment instrument takes the form of a mobile device application, the CPT (and/or the EGM) additionally or alternatively communicates data to the mobile device application which results in the mobile device displaying a message confirming the completed fund transfer transaction. In these different embodiments, the receipt confirming the completed fund transfer transaction includes information associated with the transaction, such as, but not limited to, the amount of funds transferred, the date/time of the transfer, an identifier associated with the account from which the funds were transferred from, an EGM identifier association with the transfer, and/or a reference identifier of the transfer. In certain embodiments, when a receipt confirming the completed fund transfer transaction is available, the CPT, the mobile device and/or the EGM (or a component of a gaming establishment management system associated with the EGM, such as a SMIB) notifies the user via playing a sound, displaying a graphic and/or otherwise conveying to the user that the receipt is available for collection.

In certain embodiments, the CPT asks the user if they want a receipt of the fund transfer transaction and enables the user to choose whether or not to receive a receipt confirming the completed fund transfer transaction. In certain embodiments, the CPT requires the user to make the receipt choice before starting the buy-in transaction. In certain embodiments, the CPT requires the user to make the receipt choice as part of the workflow of the buy-in transaction. In certain embodiments, the CPT requires the user to make the receipt choice after a completion of the buy-in transaction. In certain embodiments, rather than asking the user if they want a receipt, the CPT automatically causes a receipt confirming the completed fund transfer transaction to be made available to the user.

In certain embodiments, the CPT (and/or the payment gateway and/or the EGM) impose zero, one or more limits on the transfer of funds from a financial institution account to the credit balance of the EGM. That is, since operators in certain jurisdictions are required to implement hard limits, soft limits, and/or user configurable limits that offer a form of user protection against problem gambling, the CPT (and/or the payment gateway and/or the EGM) of certain embodiments employ zero, one or more of such limits to fund transfers involving the financial institution account. For example, prior to completing a requested transfer of funds from a bank account to a credit balance of an EGM, the CPT (and/or the payment gateway and/or the EGM) determines if the transfer would be in compliance with (or otherwise violate) one or more deposit limits associated with responsible gaming. In this example, if the determination is to complete the attempted transfer because such a transfer is in compliance with any applicable controls or limits, the CPT (and/or the payment gateway and/or the EGM) operates to complete the transaction as described above. On the other hand, if the determination is that the transfer would violate one or more deposit limits (and/or, as described in more detail below, the transfer is flagged by a component of one of the involved systems as a potential money laundering transaction), the CPT (and/or the payment gateway and/or the EGM) operate to deny the attempted transfer or invokes one or more additional security measures (such as requiring gaming establishment personnel to approve the transaction, requiring a modification to the transaction, and/or requiring additional information in association with the transaction). That is, even if the transfer of funds from the financial institution account would otherwise be allowable, the CPT (and/or the payment gateway and/or the EGM) apply additional conditions to the potential transfer.

It should be appreciated that in these embodiments, since the CPT (and/or the payment gateway) are in the middle of all fund transactions between the financial institution account and the EGM, the CPT (and/or the payment gateway) monitors for compliance with one or more limits and denies transfers once users are over the applicable limit. As such, one or more CPTs (and/or payment gateway) are tasked with monitoring activity of the financial institution account, such as funding transactions, and accepting or rejecting such activity based on the currently configured limits associated with the financial institution account relative to certain prior activity, if any, during an applicable period of time. Accordingly, to balance the need to prevent unauthorized access to the funds of the financial institution account against the need to provide a frictionless experience for users, the CPT (and/or payment gateway and/or EGM) dynamically employs one or more limits as appropriate.

In certain embodiments, based on the compliance (or lack thereof) of one or more limits imposed, the CPT (and/or payment gateway and/or an EGM) notifies the user of a status of the attempted transaction via a message displayed at any suitable device, via an email, via an SMS or text message, and/or via a notification displayed by a mobile device application. For example, the CPT (and/or the payment gateway) operate to inform the user that they have hit (or are near hitting) an applicable limit.

In addition to imposing one or more limits to aid in responsible gaming, it should be appreciated that since certain jurisdictions support various types of limits on funds associated with gaming establishment accounts (e.g., certain Nevada regulations require deposit limits on each instrument used to fund an account and other Nevada regulations require a cashless wagering account to enable a user to set a deposit limit over a desired period of time), certain of the limits associated with funds that flow to/from gaming establishment accounts are imposed on CPT facilitated transactions involving funds that flow to/from one or more financial institution accounts.

Accordingly, in view of different sources of limits, in certain embodiments, the CPT (and/or payment gateway and/or EGM) will implement certain applicable required limits (e.g., funding limits) and/or certain applicable requested limits (e.g., user imposed limits) on a per account, per payment instrument, per unit of time and/or per transaction basis.

In certain embodiments, the imposed limits are associated with an amount of funds transferred between a financial institution account and one or more credit balances of one or more EGMs over a given period of time (e.g., hourly, daily, weekly, monthly). For example, the CPT (and/or any of a payment gateway, an EGM, a server associated with a gaming establishment or an operator) places a $10000 per day limit on transfers of funds, using one or more CPTs, from a financial institution account to one or more credit balances of one or more EGMs. In these embodiments, such imposed limits pertain to the frequency of transferring funds from the financial institution account and/or the amounts accessed. In certain embodiments, these imposed limits and/or additional security measures are applicable for each of the EGM destinations of funds from a financial institution account. In certain other embodiments, these imposed limits and/or additional security measures are applicable for certain of, but not each of, the EGM destinations of funds from a financial institution account. In another example, the CPT (and/or any of a payment gateway, an EGM, a server associated with a gaming establishment or an operator) places a $10000 per day limit on deposits of funds, using one or more CPTs, to a financial institution account from one or more EGMs. In these embodiments, such imposed limits pertain to the frequency of depositing funds to a financial institution account and/or the amounts deposited. In certain embodiments, these imposed limits and/or additional security measures are applicable for each of the EGM funding sources available to deposit funds to a financial institution account. In certain other embodiments, these imposed limits and/or additional security measures are applicable for certain of, but not each of, the EGM funding sources available to deposit funds to a financial institution account.

In certain embodiments, the imposed limits are associated with a quantity and/or an amount of transactions involving funds transferred between a financial institution account and one or more credit balances of one or more EGMs over a given period of time (e.g., hourly, daily, weekly, monthly). In these embodiments, such imposed limits pertain to the frequency of transferring funds to/from a financial institution account and/or the amounts accessed. In certain embodiments, the imposed limits are assessed as per transaction limits that are implemented by the CPT (and/or payment gateway and/or EGM). In such embodiments, each device is operable to configure (and implement) the limit separately.

In certain embodiments, the imposed limits are additionally or alternatively associated with the amount of a transaction involving funds transferred between a financial institution account and an EGM. In certain embodiments, the imposed limits are additionally or alternatively associated with a time of when the transaction is attempted to be made. In certain embodiments, the imposed limits are additionally or alternatively associated with an amount of funds currently maintained in a financial institution account. In certain embodiments, the imposed limits are additionally or alternatively associated with a current rate of consumption of the funds in one or more financial institution accounts. In one such embodiment, the rate of consumption is based on an amount of transactions made using funds from a financial institution account over a set period of time, such as the current day. In another such embodiment, the rate of consumption is based on an amount of transactions made using funds from a financial institution account over a rolling period of time, such as the past 24 hours.

In certain embodiments, the imposed limits are associated with individual payment instruments. In these embodiments, the imposed limits are associated with the amount of one or more transactions involving funds transferred between a financial institution account and one or more credit balances of one or more EGMs per individual payment instrument over a period of time. It should be appreciated that to facilitate such an individual payment instrument limit, the CPT (and/or payment gateway and/or EGM) utilizes an identifier for certain individual payment instruments to track the fund transfer activities of such individual payment instruments. For example, if a user chooses to leverage a debit card (or a credit card) held in an electronic wallet on a mobile device, neither the CPT nor the payment gateway will have visibility to the card number. However, since the system operating with the electronic wallet communicates an additional value (e.g., a device account number which is a unique ID for the debit card on the mobile device) that is uniquely identifying and device specific, the CPT (and/or payment gateway and/or EGM) utilizes this additional value to implement a per payment instrument limit. In another example, if a user chooses to leverage a chip and PIN debit card (or a chip and PIN credit card) or an EMV card, neither the CPT nor the payment gateway will have visibility to the card number. However, since the system operating with these cards communicates an additional value (e.g., a unique token generated per payment transaction) that is uniquely identifying and device specific, the CPT (and/or payment gateway and/or EGM) utilizes this additional value to implement a per payment instrument limit.

In certain embodiments, the imposed limits are associated with an identity of whom may initiate a transaction involving funds transferred between a financial institution account and an EGM. For example, the CPT (and/or payment gateway and/or EGM) determines that a user enrolled in a player tracking system who qualifies as a bronze status member may transfer up to $500 from a financial institution account to an EGM employing the CPT and the payment gateway, while another user who qualifies as a platinum status member may transfer up to $1000 from a financial institution account to an EGM employing the CPT and the payment gateway. In certain such embodiments, one or more activities of an identified user factor into the employment (or lack thereof) of one or more imposed limits. For example, the CPT (and/or payment gateway and/or EGM) adjusts a limit amount based on one or more of, has the user gambled or started a gaming session recently (e.g., last day, last hour), has the user won at a gaming establishment (and if so, the amount of those winnings), and/or is the user checked into a hotel of a gaming establishment.

In certain embodiments, the imposed limits are associated with an identifier of the EGM associated with a transaction involving funds transferred between a financial institution account and that EGM. In certain embodiments, the imposed limits are additionally or alternatively associated with a location of the EGM. In these embodiments, different locations of EGMs where the funds from a financial institution account may be transferred to are associated with different imposed limits.

It should be appreciated that in different embodiments, the system employs a combination of these imposed limits to determine whether or not a transaction involving funds transferred between a financial institution account and an EGM is permitted and/or any additional security measures need to be activated. It should be further appreciated that in certain embodiments, one or more limits set at one device are communicated to another device to further streamline the workflow required to set and impose such limits. For example, a per transaction limit configured at a first EGM is communicated to a CPT integrated with that EGM and then communicated, via the payment gateway or a CPT host system, to one or more other CPTs integrated with one or more other EGMs.

In certain embodiments, the system enables the user to determine and activate zero, one or more limits to associate with a financial institution account as well as zero, one or more additional security measures to employ. In these embodiments, if any user determined limits are violated, the system prevents unauthorized transfers of funds between the financial institution account and an EGM (or attempts to modify to be in compliance with such limits). In certain embodiments, the determination to associate one or more limits and/or additional security measures is based on one or more inputs from the user wherein the user indicates that they would like one or more limits and/or additional security measures associated with certain of (or each of) the transfers of funds to/from the financial institution account. For example, the user sets a responsible gaming limit for a set period of time, such as a calendar day, a set quantity of hours (e.g., 24 hours), and/or a period of time.

In certain embodiments, the system enables an operator, such as a gaming establishment operator, to determine and activate zero, one or more limits to associate with a financial institution account as well as zero, one or more additional security measures to employ. In these embodiments, if any operator determined limits are violated, the system prevents unauthorized transfers of funds between the financial institution account and an EGM (or attempts to modify to be in compliance with such limits). In certain embodiments, the determination to associate one or more limits and/or additional security measures is based on one or more inputs from an operator wherein personnel, such as gaming establishment personnel indicate that they would like one or more limits and/or additional security measures associated with certain of (or each of) the transactions with funds to/from the financial institution account.

In certain embodiments, the system employs the same limits and/or additional security measures for each user whom attempts to transact funds using the CPT. In certain embodiments, the system employs different limits and/or additional security measures for different users whom attempt to transact funds using the CPT. In certain of these embodiments, the system utilizes historical data regarding the user and past transactions in determining one or more aspects of one or more limits and/or additional security measures to associate with that user. In certain of these embodiments, the system utilizes one or more attributes of the user, such as a player tracking account status of the user, in determining one or more aspects of one or more limits and/or additional security measures to associate with that user.

It should be appreciated that in certain embodiments, one or more of the limits and/or additional security measures may be overridden and/or adjusted by qualifying personnel, such as gaming establishment personnel. In these embodiments, the system associates different levels of overriding and/or adjusting of limits and/or additional security measures with different qualifying personnel. In these embodiments, the system enables different levels of overriding and/or adjusting of limits and/or additional security measures for different users based on one or more attributes, such as status or historical spend, of such users.

In certain embodiments, in addition to or alternative from utilizing a CPT integrated with an EGM to facilitate the transfer of funds from a financial institution account to a credit balance of the EGM, the CPT integrated with an EGM facilitates the transfer of funds from a credit balance of the EGM to a financial institution account. In such embodiments, the CPT operates with the payment gateway as a cashout device to facilitate the transfer of funds from a credit balance of an EGM to a financial institution account independent of such funds being transferred to any gaming establishment accounts (thereby saving users time and effort in having to set up such a gaming establishment account as well as saving processing resources by reducing the quantity of accounts such funds have to travel to before reaching the financial institution account).

In certain embodiments, upon a user, such as a player, making one or more inputs to cashout a credit balance of the EGM, such as a player engaging a cashout button of the EGM, the CPT (and/or payment gateway and/or EGM) determines if part or all of the funds from the credit balance of the EGM were sourced from a financial institution account using the CPT and the payment gateway. In these embodiments, if none of the funds from the credit balance of the EGM were sourced from a financial institution account using the CPT and the payment gateway, the EGM provides the funds of the credit balance via any suitable avenue, such as, but not limited to, distributing cash, distributing a cashless ticket voucher, transferring the funds to a cashless wagering account or transferring the funds to a financial institution account using the CPT as described below.

On the other hand, if the CPT (and/or payment gateway and/or EGM) determines that part or all of the funds from the credit balance of the EGM were sourced from a financial institution account using the CPT and the payment gateway, the CPT communicates data, via an established connection with the payment gateway (e.g., a direct connection between the CPT and the payment gateway or an indirect connection, such as a cloud-based connection in which both the CPT and the payment gateway communicate with a cloud system that facilitates the communication between the CPT and the payment gateway), to a component of the financial institution to initiate a transfer of funds from the credit balance of the EGM to the financial institution account. Specifically, one or more processors of the CPT executing one or more sets of instructions stored by one or more memory devices of the CPT communicates data to the payment gateway which communicates part or all of such data to one or more financial institution servers to transfer funds from the credit balance of the EGM to the financial institution account. In certain embodiments, to facilitate this cashout transaction, the CPT utilizes data stored in association with the financial institution account from the funding transaction as part of this transaction. In certain embodiments, to facilitate this cashout transaction, the CPT prompts the user to reprovide or represent the payment instrument associated with the financial institution account as part of this transaction.

In certain embodiments, following the financial institution acknowledging the transfer and authorizing an increase (or a designation of an increase) of the balance of the financial institution account via an original credit transaction, an account funding transaction, and/or an electronic funds transfer, the CPT operates with the EGM to modify the credit balance of the EGM based on the transferred amount of funds. In certain such embodiments, one or more processors of the CPT execute one or more sets of instructions stored by one or more memory devices to operate with the master gaming controller of the EGM to complete the transfer of funds or fund data from the EGM. Such a transfer of funds or fund data includes the EGM updating the credit balance of the EGM to reflect the transfer of funds to the financial institution account. Following the completed transfer of funds or fund data from the EGM, the CPT communicates one or more completed transaction confirmations. In certain embodiments, the CPT communicates, via the payment gateway, a completed transaction confirmation to the financial institution.

Figure 4A:
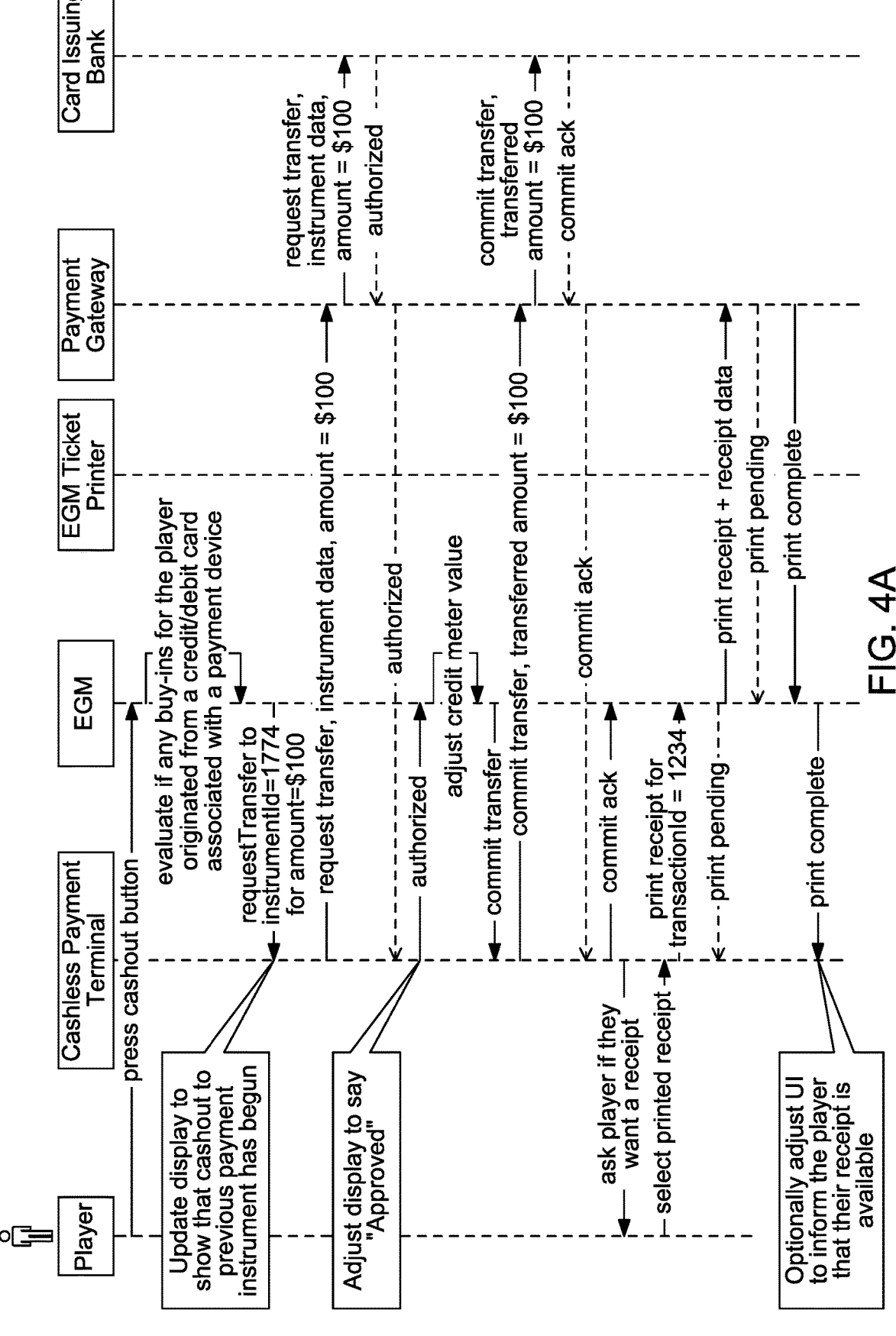
FIGS. 4A and 4B are flow charts of example processes of employing a cashless payment terminal to cashout a credit balance of an electronic gaming machine to a financial institution account.

Accordingly, in certain embodiments, the CPT operates with the payment gateway to form the connection between the financial institution and the EGM necessary to facilitate a transfer of funds or fund data from the EGM to the financial institution. For example, as seen in FIG. 4A (which illustrates the described interactions between a player, the CPT, the EGM, the payment gateway, an EGM printer and the financial institution that maintains the financial institution account which funds are transferred to), certain embodiments enable a player to interact with the CPT to cashout an amount of funds from a credit balance of the EGM to a financial institution account associated with a payment instrument previously presented to the CPT in association with funding the credit balance of the EGM. In this example, the CPT proceeds to operate, via the payment gateway, with the financial institution (i.e., the card issuing bank) to transfer the amount of funds from the credit balance to the financial institution account. In this example, if the financial institution authorizes the transfer, the CPT operates with the EGM to decrease the credit meter of the EGM by the transferred amount of funds. It should be appreciated that in this example, by limiting the funds of the credit balance of the EGM to having to be returned to the financial account associated with the source funding instrument, the CPT complies with various anti-money laundering regulations.

In certain embodiments, the CPT enables the user to select where funds being cashed out from the credit balance of the EGM should be directed to. In these embodiments, as long as the user complies with any applicable limits associated with cashing out funds (e.g., cashout limits to a particular funding instrument per day and/or per EGM), the CPT enables the user to select which of a plurality of different payment instruments to cashout the funds of an EGM to. In certain embodiments, upon a user, such as a player, making one or more inputs to cashout a credit balance of the EGM, such as a player engaging a cashout button of the EGM, the CPT enables the user to select a cashout destination. In these embodiments, if the user selects a non-financial institution account cashout destination, such as cash, a cashless ticket voucher or a transfer to a cashless wagering account, the EGM proceeds with cashing out the credit balance of the EGM to such a non-financial institution account cashout destination. On the other hand, if the user selects a financial institution account cashout destination, the CPT prompts the user to cause a payment instrument, such as a bank card associated with a financial institution account or a mobile device executing a mobile device application associated with the financial institution account, to engage the CPT as described above in relation to funding the credit balance with an amount of funds from a financial institution account associated with a payment instrument. In these embodiments, following the CPT obtaining, from the presented payment instrument, data associated with the financial institution account to identify the user, the financial institution and/or the financial institution account, the CPT communicates data, via an established connection with the payment gateway, to a component of the financial institution to initiate a transfer of funds from the credit balance of the EGM to the financial institution account. Specifically, one or more processors of the CPT executing one or more sets of instructions stored by one or more memory devices of the CPT communicates data to the payment gateway which communicates part or all of such data to one or more financial institution servers to transfer funds from the credit balance of the EGM to the financial institution account.

In certain embodiments, following the financial institution acknowledging the transfer and approving an increase (or a designation to increase) of the balance of the financial institution account via an original credit transaction, an account funding transaction, and/or an electronic funds transfer, the CPT operates with the EGM to modify the credit balance of the EGM to account for such a transfer. In certain such embodiments, one or more processors of the CPT execute one or more sets of instructions stored by one or more memory devices to operate with the master gaming controller of the EGM to complete the transfer of funds or fund data from the EGM. Such a transfer of funds or fund data includes the EGM updating the credit balance of the EGM based on the transferred amount of funds. Following the completed transfer of funds or fund data to the EGM, the CPT communicates one or more completed transaction confirmations. In certain embodiments, the CPT communicates, via the payment gateway, a completed transaction confirmation to the financial institution.

Figure 4B:
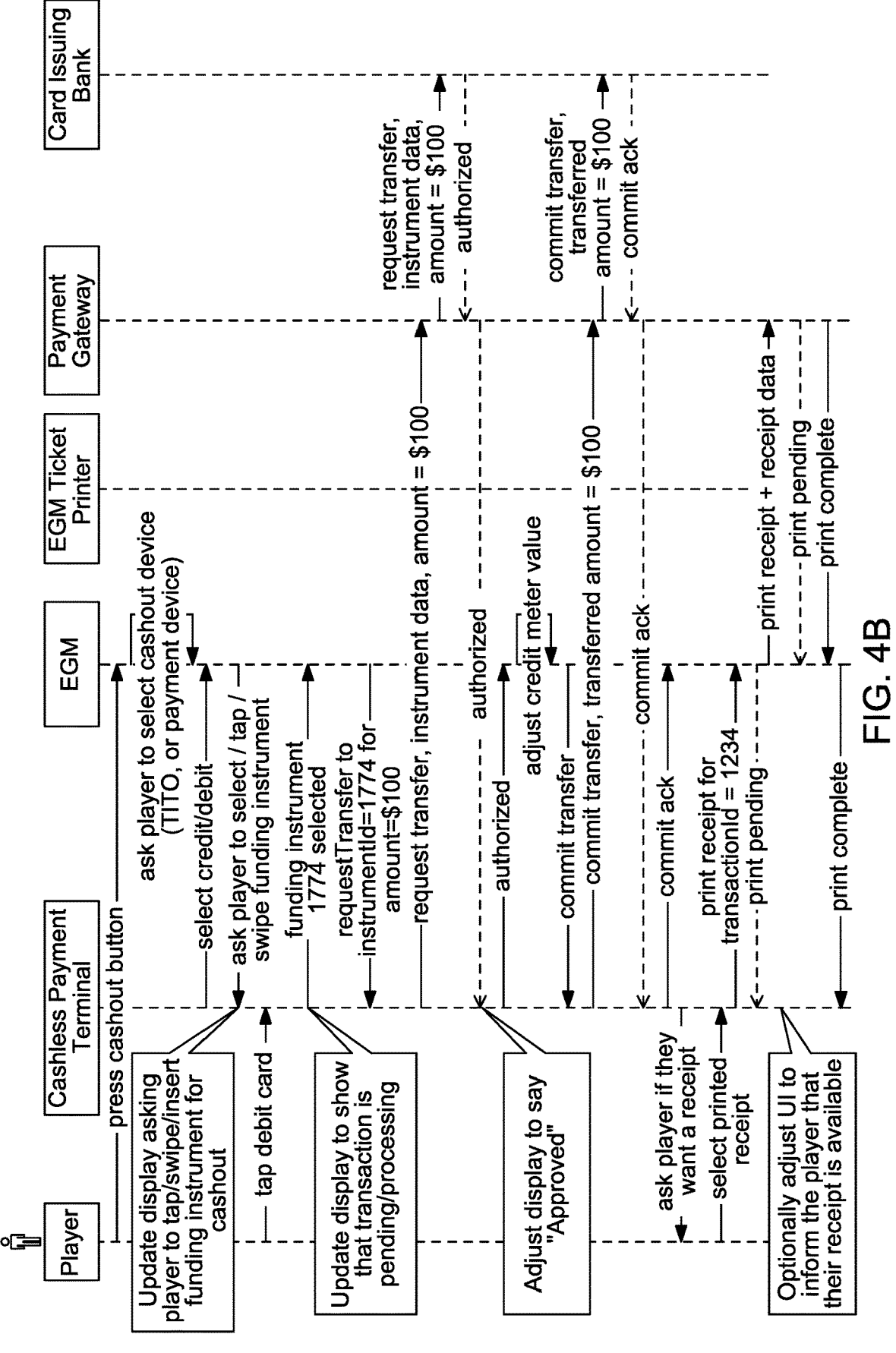

Accordingly, in certain embodiments, the CPT operates with the payment gateway to form the connection between the financial institution and the EGM necessary to facilitate a transfer of funds or fund data from the EGM to a user selected account of a financial institution. For example, as seen in FIG. 4B (which illustrates the described interactions between a player, the CPT, the EGM, the payment gateway, an EGM printer and the financial institution that maintains the financial institution account which funds are transferred to), certain embodiments enable a player to interact with the CPT to cashout an amount of funds from a credit balance of the EGM to a user selected financial institution account associated with a payment instrument presented to the CPT. In this example, the CPT proceeds to operate, via the payment gateway, with the financial institution (i.e., the card issuing bank) to transfer the amount of funds from the credit balance of the EGM to the financial institution account. In this example, if the financial institution authorizes the transfer, the CPT operates with the EGM to decrease the credit meter of the EGM by the transferred amount of funds. It should be appreciated that as seen in this example, the CPT operates with a payment gateway to facilitate the transfer of funds to the financial institution account from a credit balance of the EGM independent of such funds being transferred to any gaming establishment accounts, such as any cashless wagering accounts, which results in saving users time and effort in having to set up such a gaming establishment account as well as saving processing resources by reducing the quantity of accounts such funds have to travel to before reaching the financial institution account.

In certain embodiments, following the funding of the financial institution account with funds from a credit balance of the EGM (and independent of any gaming establishment account), the CPT generates a receipt memorializing the transaction. In these embodiments, following the completion of a transaction that results in decreasing a credit balance of an EGM with funds transferred to a financial institution account, such as a bank account, one or more components communicate a completed transaction confirmation to the user. In certain embodiments, the CPT operates with a printer of the EGM to cause the printer of the EGM to print a receipt confirming the completed cashout fund transfer transaction. In certain embodiments, the CPT includes a printer operable to print a receipt confirming the completed cashout fund transfer transaction. In certain embodiments, the CPT enables the player to enter contact information, such as an email and/or mobile phone number, and the CPT (and/or EGM) electronically provides a receipt confirming the completed cashout fund transfer transaction via an email and/or via an SMS or text message. In certain embodiments in which the payment instrument takes the form of a mobile device application, the CPT additionally or alternatively communicates data to the mobile device application which results in the mobile device displaying a message confirming the completed cashout fund transfer transaction. In these different embodiments, the receipt confirming the completed cashout fund transfer transaction includes information associated with the transaction, such as, but not limited to, the amount of funds transferred, the date/time of the transfer, an identifier associated with the account to which the funds were transferred, an EGM identifier association with the transfer, and/or a reference identifier of the transfer. In certain embodiments, when a receipt confirming the completed cashout fund transfer transaction is available, the CPT, the mobile device and/or the EGM (or a component of a gaming establishment management system associated with the EGM, such as a SMIB) notifies the user via playing a sound, displaying a graphic and/or otherwise conveying to the user that the receipt is available for collection.

In certain embodiments, the CPT asks the user if they want a receipt of the fund transfer transaction and enables the user to choose whether or not to receive a receipt confirming the completed cashout fund transfer transaction. In certain embodiments, the CPT requires the user to make the receipt choice before starting the cashout transaction. In certain embodiments, the CPT requires the user to make the receipt choice as part of the workflow of the cashout transaction. In certain embodiments, the CPT requires the user to make the receipt choice after a completion of the cashout transaction. In certain embodiments, rather than asking the user if they want a receipt, the CPT automatically causes a receipt confirming the completed cashout fund transfer transaction to be made available to the user.

In certain embodiments, the system enables the user to set a cashout destination which the CPT employs, if applicable, upon a cashout event. In certain embodiments, the system enables an operator, such as a gaming establishment operator, to set a cashout destination which the CPT employs, if applicable, upon a cashout event. In certain embodiments, the system determines and sets a cashout destination which the CPT employs, if applicable, upon a cashout event. In these embodiments, if the system determines that a cashout event warrants the CPT operating with the payment gateway to transfer funds from the credit balance of the EGM to a financial institution account, the CPT automatically proceeds with attempting to execute this transaction. On the other hand, if the system determines that a cashout event warrants another component of the system transferring funds from the credit balance of the EGM elsewhere, such as to a cashless wagering account, the system invokes the other component of the system, such as a server of a cashless wagering system, to automatically proceed with attempting to execute such a transaction.

In certain embodiments in which the CPT is employed to transfer funds between a financial institution account and an EGM, the CPT effectively operates as a payment device and/or a cashout device of the EGM and such transactions need to be properly metered for various reasons, such as accounting reasons, audit reasons and/or dispute resolution reasons. In these embodiments, since certain gaming establishments employ an accounting audit process in which a gaming device management system (e.g., a slot accounting system) periodically reads one or more meters from various gaming devices (e.g., EGMs on a casino floor) and compares those meters to the actual cash and/or cashless ticket vouchers obtained from the gaming devices during an audit/drop process and/or to the funds transferred to/from the various gaming devices from cashless wagering accounts, the CPT of the present disclosure maintains one or more meters to assist in this accounting audit process. In such embodiments, the CPT maintains one or more meters (or operates with the EGM and/or the payment gateway to maintain one or more meters) that track fund transfers onto the EGM made in association with the CPT, count of fund transfers onto the EGM made in association with the CPT, fund transfers off the EGM made in association with the CPT, and/or count of fund transfers off the EGM made in association with the CPT.

In certain embodiments, once these meters are implemented in the EGM, the EGM and/or the CPT enables such meters to be exposed over a protocol to a host system, such as an accounting system. In these embodiments, when reading these meters, the host system audits these meters against the historical transactions recorded and exported to the accounting system by the payment gateway (or a back-end system from the payment gateway funding provider) to flag any discrepancies (i.e., variances). Such flagging enables operator personnel, such as a member of accounting staff, to further investigate and resolve the variance. In certain embodiments, the EGM and/or the CPT additionally or alternatively enables such meters to be exposed in one or more operator menus so that the meters can be manually inspected or viewed at the EGM. For example, the EGM adds an operator menu of the EGM to view the CPT meters.

Figure 5A:
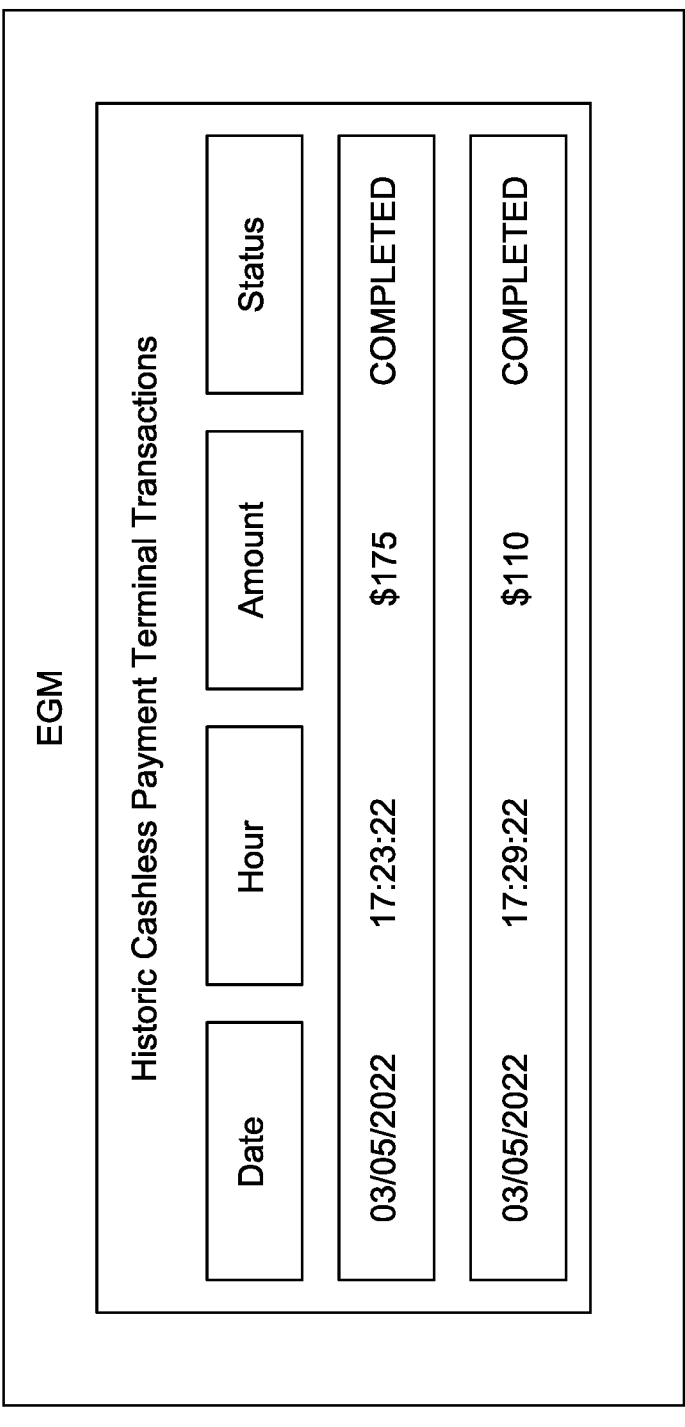
FIG. 5A is an example user interface displayed in association with a dispute involving a cashless payment terminal facilitated transfer of funds between an electronic gaming machine and a financial institution account.

It should be appreciated that disputes may occasionally arise in association with a user employing the CPT to transfer funds between an EGM and a financial institution account, such as when a user disputes that a certain transaction occurred or the user disputes an amount of the transaction. For example, if a user taps their debit card on a CPT and selects to transfer $100 to the EGM, the user may claim that the system only credited $90 to the EGM's credit meter. In view of these situations and to help operator staff and/or regulatory staff handle such disputes, the EGM displays a history of transactions with the CPT. For example, as seen in FIG. 5A, the EGM displays one or more records of transactions involving the CPT in which each record includes one or more of a time of the transaction, an amount of the transaction and/or a payment instrument identification (e.g., the last 4 digits of a debit card) used with the transaction.

In another embodiment, in addition to or alternative from the EGM displaying one or more records of one or more transactions involving the CPT, the CPT displays such records to help operator and/or regulatory staff handle such disputes. For example, as seen in FIG. 5B, through a series of screens, an operator utilizes the CPT to investigate the transaction details associated with one or more transactions using the CPT. In this example, in addition to viewing the transaction details of successful transactions, the CPT (and/or the EGM) views details about historical transactions that have failed, such as because an attempted transaction was denied by a card issuing bank, denied by the payment gateway because a user hit an applicable limit, or denied by the EGM because the selected amount would put the EGM over a limit, such as a credit meter limit. It should be while FIG. 5B illustrates an operator and/or regulatory staff opening a service menu on the CPT and entering a PIN to access one or more transaction details, in certain other embodiments, the operator and/or regulatory staff utilize a service key at the EGM to cause the EGM to enter a service mode which causes the CPT to enter a service mode to enable the operator and/or regulatory staff to access one or more transaction details.

In certain embodiments, as mentioned above, in view of certain money laundering risks associated with various transfers of funds, the system limits the CPT (and the EGM) to only permit one source of funding to be active at a given point in time. In one such embodiment, if a user deposits funds into the EGM using a bill validator, the EGM disables the CPT to prevent the mixing of funds obtained via a financial institution account payment instrument, such as a credit card or a debit card, with funds obtained via another pathway (i.e., the system prevents mixing of funds with the cash obtained via the bill validator). In another embodiment, if a user funds the EGM's credit meter via the CPT with funds from a financial institution account accessed via a financial institution account payment instrument, such as a credit card or a debit card, the EGM disables other funding sources, such as the bill validator or cashless wagering account transactions, until the user has left the EGM, or the EGM's credit meter has been reduced to a threshold amount, such as a zero balance.

In certain additional or alternative embodiments that impose one or more limits, since certain funds deposited to an EGM creates potential money laundering risks (e.g., a user could solely fund an EGM using illicit cash, then transfer, using the CPT, those funds to a financial institution account and later use such funds to buy luxury goods or services from a retailer), the system of the present disclosure detects these scenarios, and potentially blocks them. In these embodiments, the CPT (and/or the payment gateway) imposes limits for a particular payment instrument if the system observes that a particular user continually cashes out funds without wagering the majority of the cashed out funds. In one such embodiment, the CPT (and/or another component of the system, such as the payment gateway) prevents a user from transferring funds from an EGM to a financial institution account if the funds deposited were not wagered. In another such embodiment, if a user continually deposits, using the CPT, funds to an EGM from their debit card, wagers nothing and then cashes such funds to a cashless ticket voucher, the CPT (or the EGM or another component of the system, such as the payment gateway) limits future transactions for that user.

In certain embodiments, upon the system detecting certain potential money laundering scenarios, such as when a user performs a cashout of funds obtained from a CPT but not otherwise wagered at the EGM, the CPT (and/or the EGM and/or another component of the system, such as the payment gateway) reports to a CPT host system and/or a resident gaming establishment host system the cashout amount, and may provide breakdowns (using various methods) of the source of cashed out funds (e.g., game win, cash deposits, cashless ticket voucher deposits, cashless wagering account deposits, CPT deposits) and a unique identifier for the user's payment instrument. The CPT host system and/or the resident gaming establishment host system can analyze the reported information (or the casino operator can leverage the system to analyze the reported behavior), and then the CPT host system and/or resident gaming establishment host system could automatically (or on command by the operator) inform the EGM, the CPT, and/or the payment gateway, of a limit placed on the payment instrument based on the reported data. For example, if a player makes at least five deposits of $50 or more to an EGM within a seven day period using their debit card and the player cashes those funds out to a cashless ticket voucher without wagering them, then the CPT host system and/or the resident gaming establishment host system will work with the CPT and/or the payment gateway to reject or block all funding at the EGM by that player using the payment instrument they previously utilized.

In certain embodiments, upon the system detecting certain potential money laundering scenarios, such as when a user performs a cashout of funds obtained utilizing the CPT but not wagered at the EGM, the CPT (and/or the EGM and/or another component of the system, such as the payment gateway) additionally or alternatively reports the appropriate information that must be filed with financial crimes regulators in a given jurisdiction. In one such embodiment, the CPT (and/or the EGM and/or another component of the system, such as the payment gateway) reports on user attempts to transfer certain amounts of funds to a financial institution account that have not been wagered. In one such embodiment, the system generates reports of all attempted transfers that have not been wagered over a defined lookback period. Such an embodiment enables gaming establishment personnel the ability to have the appropriate information to file one or more suspicious activity reports with financial crimes regulatory agencies, such as the US Treasury's FinCEN. In another such embodiment, upon detection of a suspicious financial transaction event, the system automatically fills in the appropriate regulatory agency report (e.g., Suspicious Activity Report (SAR), Currency Transaction Report (CTR)) for submission by the gaming establishment to the regulatory body. In another such embodiment, the system electronically submits the generated reports to the appropriate regulatory body.

In certain embodiments, in association with utilizing the CPT to transfer funds between a credit balance of an EGM and a financial institution account, the system imposes certain fees. In certain embodiments, if the user deposits funds directly to an EGM via employing the CPT, the system imposes a minimum fixed fee or a fee of a percentage of the amount transferred. In certain embodiments, if the user transfers funds to a financial institution account from an EGM via employing the CPT in association with a cashout transaction, the system imposes a minimum fixed fee or a fee of a percentage of the amount transferred. In certain embodiments, if any fees are collected, the EGM exposes meters for those fees so that the fees reported by the CPT and/or the payment gateway can be audited against CPT activity. In different embodiments, the amount of fees and/or the frequency of fees being imposed varies based upon various factors, such as, but not limited to, an identity of a user, a rank of the user (e.g., a player tracking status ranking), a time of day, a day of the week, a day of the month, an operator configuration, and/or the amount being transferred.

It should be appreciated that certain situations arise in which the system cancels or otherwise aborts an attempted transaction of transferring an amount of funds or fund data between a financial institution account and an EGM using the CPT. For example, a user attempts to deposit funds to a credit balance of the EGM using the CPT, but the user's debit card transfer is denied by their bank. In another example, a user attempts to transfer funds from the credit balance of the EGM upon a cashout event via an original credit transaction to a user selected (or system selected) payment instrument, but the original credit transaction fails. In these examples, the failure of the transfer results in a CPT status of a failure or a fault. In addition to these situations in which the system cancels the attempted transaction, the user may make one or more inputs to cancel the attempted transaction. In view of these situations, in certain embodiments in which the CPT includes a display device, the CPT displays one or more statuses to update the user with information about the status of the transaction and/or the status of the CPT. For example, when a deposit of funds to a credit balance of an EGM fails because the credit card or debit card issuing bank has declined the transaction, the CPT displays the error because the EGM likely has not been informed yet of the transaction. In certain other embodiments in which the CPT lacks a display device, the CPT operates with the EGM to cause a display device of the EGM to display one or more statuses to update the user with information about the status of the transaction and/or the status of the CPT. In certain other embodiments in which the CPT lacks a display device, the EGM causes a display device of the EGM to display a transaction status and/or a CPT status based upon the information the EGM is currently aware of.

In certain embodiments, in addition to or alternative from displaying a transaction status and/or a CPT status, the CPT and/or the EGM alter how they operate in association with certain situations. For example, if a user attempts to transfer funds from the credit balance of the EGM upon a cashout event via an original credit transaction to a user selected (or system selected) payment instrument, but the original credit transaction fails, since the EGM is in the middle of the transaction, the EGM adjusts how it operates. In one embodiment, when a CPT facilitated cashout failure occurs, the EGM enters a tilt mode or fault mode and notifies the operator requiring the operator to intervene and pay the user their owed funds via one of the supported cashout devices.

In another embodiment, when a CPT facilitated cashout failure occurs, the EGM selects the another available cashout device and, in certain instances, communicates a notification of the failure. For example, if the user cashout to a previously used debit card fails, the EGM notifies a host of the failure, and moves to another available cashout device, such as issuing a cashless ticket voucher to the user for the cashed out amount. In one such embodiment, when employing another cashout device, the EGM and/or the CPT displays information to the user why the other cashout device was employed.

Figure 6:
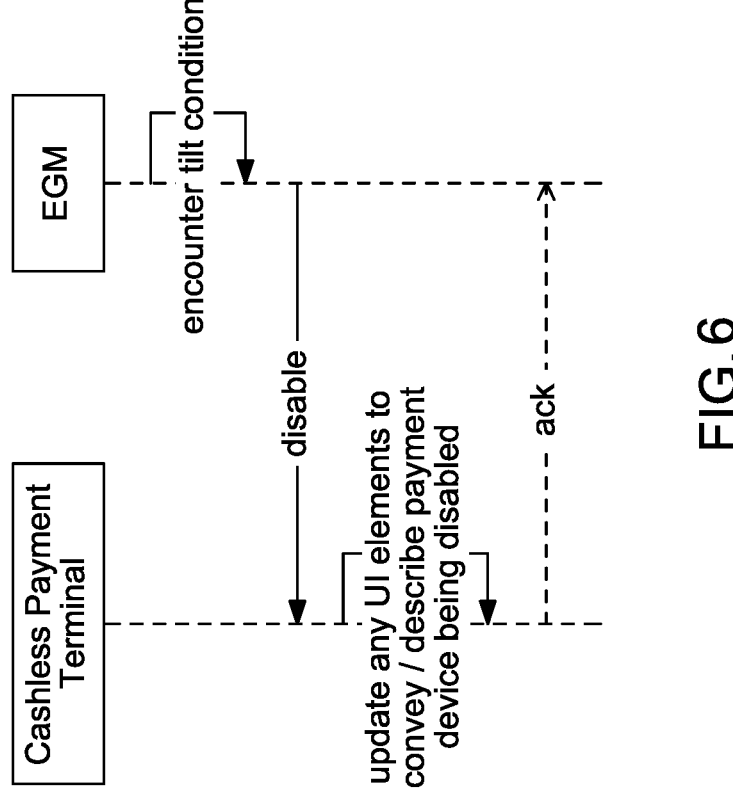
FIG. 6 is a flow chart of an example process of synchronizing state data between a cashless payment terminal and an electronic gaming machine.

In certain embodiments, in addition to accounting for errors in CPT facilitated transactions, the CPT and EGM operate to account for one or more events that occur that cause the EGM to enter a designated state, such as a tilt state. In certain such embodiments, the CPT synchronizes with the state of the EGM to reflect the designated state. For example, as seen in FIG. 6, if an EGM becomes disabled due to one of many failure conditions (e.g., a software failure, a failure of another peripheral or upon receipt of a host command) such that the EGM is in a state where it cannot accept a transaction from the CPT or initiate a transaction with the CPT, the EGM notifies the CPT to block the initiation of a new transaction (and/or disable itself). In certain embodiments, when the EGM exits the designated state, such as the tilt state, the CPT synchronizes with the state of the EGM to reflect the exit from the designated state. In these embodiments, when the EGM state is updated to no longer be in a state where deposits are no longer blocked, the EGM communicates data to the CPT to cause the CPT to enable itself.

In certain embodiments, in addition to or alternative from synchronizing states between the EGM and the CPT, the system synchronizes one or more settings between the EGM and the CPT. In certain such embodiments, if a user at the EGM changes a setting, such as a language employed, at the EGM, the EGM and the CPT operate to automatically cause the CPT to also change the setting, such as by also changing the language employed at the CPT. In certain other embodiments, if a user at the CPT changes a setting, such as a language employed, at the CPT, the EGM and the CPT operate to automatically cause the EGM to also change the setting, such as the language employed at the EGM. In these embodiments, any suitable setting configurable at an EGM (or a CPT) by a user and/or an operator may be correspondingly and automatically synchronized at the CPT (or the EGM).

In certain embodiments, to synchronize states between the EGM and the CPT, heartbeat messages are communicated between the EGM and the CPT. In certain of these embodiments, the CPT communicates heartbeat messages to the EGM such that if the EGM misses a heartbeat message sent by the CPT, the CPT disables itself (or the EGM communicates data that causes the CPT to disable itself). In certain other embodiments, the EGM communicates heartbeat messages to the CPT such that if the CPT does not receive a heartbeat within a certain interval (e.g., the EGM stops generating heartbeat messages due to the EGM encountering a tilt condition), the CPT disables itself until communications with the EGM have been re-established.

In certain embodiments, to synchronize states between the EGM and the CPT, the CPT initiates a transaction with the EGM when a user begins the process of initiating a transaction, such as after the user chooses an amount to transfer to the credit balance of the EGM in association with the CPT. In these embodiments, if the EGM declines the transaction because the EGM is in a tilt condition (or the EGM does not respond to the transaction request), the CPT disables itself until the CPT learns that transactions may be possible again with the EGM, such as by successfully re-establishing communications with the EGM.

Accordingly, various components of the present disclosure operate individually or collectively to enable funds to be transferred, in real time, between an EGM and a financial institution account using a payment instrument issued by a financial institution that maintains the financial institution account. Such a transfer occurs without the need to utilize a gaming establishment account (e.g., a cashless wagering account) as an intermediary and thus avoids having to wait for any fund transfers to the gaming establishment account to be completed or alternatively having to pay various surcharge fees to expedite any fund transfers to the gaming establishment account. As such, the present disclosure employs a CPT integrated with an EGM to bypass these relatively timely transfers and enable the CPT to interact, in real time and via a payment gateway, with a computing device of a banking institution (i.e., a financial institution) to transfer funds between a banking account and a credit balance of the EGM. Accordingly, the system of the present disclosure offers the benefits of payment instrument transactions without certain of the fund transfer friction previously encountered by users transferring funds between a gaming establishment account and a banking account. Such a configuration provides the user greater control over their funds and, in certain instances, enables a user to avoid having to register for a gaming establishment account to transfer funds to and/or from a banking account.

It should thus be appreciated that the integration of a CPT with an EGM facilitates a more cashless environment which decreases certain security concerns associated with cash and/or reduces certain fees associated with procuring cash. For example, integrating a CPT with an EGM to fund a gaming session at the EGM with funds transferred from a banking account provides that cash does not need to be withdrawn from a financial institution account, such as using an automated teller machine that, in exchange for a relatively high fee, dispenses an amount of cash which is then brought to an EGM. In this example, the reduction of the usage of cash increases safety (e.g., minimizing users having to carry large sums of cash and minimizing such cash being a vehicle to spread potentially harmful contagions). It should be further appreciated that the integration of a CPT with an EGM facilitates a more ticketless environment which decreases certain security concerns associated with cashless ticket vouchers and/or reduces certain infrastructure requirements associated with processing cashless ticket vouchers.

In various embodiments, the electronic fund data transfers of the present disclosure may occur in addition to or as an alternative from cash-based fund transfers and/or cashless ticket voucher-based fund transfers. In one such embodiment, an amount of funds transacted at an EGM is funded via any of an electronic fund transfer, a cash-based fund transfer or a cashless ticket voucher-based fund transfer. In another embodiment, an amount of funds transacted at an EGM is funded via an electronic fund transfer or a cash-based fund transfer (but is not funded via any cashless ticket voucher-based fund transfer). In another embodiment, an amount of funds transacted at an EGM is funded via an electronic fund transfer or a cashless ticket voucher-based fund transfer (but is not funded via any cash-based fund transfer). In another embodiment, an amount of funds transacted at an EGM is funded via an electronic fund transfer (but is not funded via a cash-based fund transfer nor a cashless ticket voucher-based fund transfer).

It should be further appreciated that any functionality or process of the present disclosure may be implemented via one or more servers (associated with or independent of any component of any system of the present disclosure), one or more CPTs, one or more non-gaming devices (e.g., a cashless ticket voucher kiosk), a mobile device application, one or more gaming devices (e.g., an EGM), and/or one or more components of a gaming establishment system (such as a component of a gaming establishment management system supported by or otherwise located inside a gaming device and/or a non-gaming device). Moreover, any communication between the different components of the present disclosure may be via a direct communication or an indirect communication, such as, but not limited to, a cloud-based connection in which multiple components communicate with a cloud system that facilitates the communication between such components.

In certain embodiments, the above-described embodiments of the present disclosure may be implemented in accordance with or in conjunction with one or more of a CPT, a payment gateway, a gaming device (e.g., an EGM), a CPT host system, and/or a component of a gaming establishment management system (e.g., a cashless wagering system or a gaming establishment patron management system). In these embodiments, such a CPT, a payment gateway, a gaming device, a CPT host system and/or a component of a gaming establishment management system each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the CPT, the payment gateway, the CPT host system, the component of a gaming establishment management system and/or the gaming device; (3) accessing memory to configure or reconfigure parameters in the memory according to indicia read from the CPT, the payment gateway, the CPT host system, the component of a gaming establishment management system and/or the gaming device; (4) communicating with interfaces and the peripheral devices (such as input/output devices); and/or (5) controlling the peripheral devices. In certain embodiments, one or more components of the controller (such as the at least one processor) reside within a housing of the CPT, the payment gateway, the CPT host system, the component of a gaming establishment management system and/or the gaming device, while in other embodiments, at least one component of the controller resides outside of the housing of the CPT, the payment gateway, the CPT host system, the component of a gaming establishment management system and/or the gaming device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the CPT, the payment gateway, the CPT host system, the component of a gaming establishment management system and/or the gaming device of the present disclosure. In certain embodiments, the at least one memory device resides within the housing of the CPT, the payment gateway, the CPT host system, the component of a gaming establishment management system and/or the gaming device, while in other embodiments at least one component of the at least one memory device resides outside of the housing of the CPT, the payment gateway, the CPT host system, the component of a gaming establishment management system and/or the gaming device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the CPT, the payment gateway, the CPT host system, the component of a gaming establishment management system and/or the gaming device; (2) associations between configuration indicia read from the CPT, the payment gateway, the CPT host system, the component of a gaming establishment management system and/or the gaming device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the CPT, the payment gateway, the CPT host system, the component of a gaming establishment management system and/or the gaming device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the CPT, the payment gateway, the CPT host system, the component of a gaming establishment management system and/or the gaming device to control the CPT, the payment gateway, the CPT host system, the component of a gaming establishment management system and/or the gaming device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) uses such a removable memory device to implement at least part of the present disclosure. In other embodiments, part or all of the program code and/or the operating data is downloaded to the at least one memory device of the CPT, the payment gateway, the CPT host system, the component of a gaming establishment management system and/or the gaming device through any suitable data network described above (such as an Internet or intranet).

The at least one memory device also stores a plurality of device drivers. Examples of different types of device drivers include device drivers for the CPT, the payment gateway, the CPT host system, the component of a gaming establishment management system and/or the gaming device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the CPT, the payment gateway, the CPT host system, the component of a gaming establishment management system and/or the gaming device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the CPT, the payment gateway, the CPT host system, the component of a gaming establishment management system and/or the gaming device loads the new device driver from the at least one memory device to enable communication with the new device. For instance, one type of card reader in the CPT, the payment gateway, the CPT host system, the component of a gaming establishment management system and/or the gaming device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the CPT, the payment gateway, the CPT host system, the component of a gaming establishment management system and/or the gaming device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the CPT, the component of a gaming establishment management system and/or the gaming device. In various embodiments, the display devices serve as digital glass configured to aspects of the gaming establishment in which the CPT, the payment gateway, the CPT host system, the component of a gaming establishment management system and/or the gaming device is located. In various embodiments, the CPT, the component of a gaming establishment management system and/or the gaming device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In certain of these embodiments, after the CPT and/or the gaming device receives an actuation, the CPT, the payment gateway, the CPT host system, the component of a gaming establishment management system and/or the gaming device operate to cause the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the CPT, the component of a gaming establishment management system and/or the gaming device provides dynamic sounds coupled with attractive multimedia images displayed on one or more of the display devices to provide an audio-visual representation or to otherwise display full-motion video with sound to attract users to the CPT, the component of a gaming establishment management system and/or the gaming device. In certain embodiments, the CPT, the component of a gaming establishment management system and/or the gaming device displays a sequence of audio and/or visual attraction messages during idle periods to attract potential users to the CPT, the component of a gaming establishment management system and/or the gaming device. The videos may be customized to provide any appropriate information.

The at least one input device may include any suitable device that enables an input signal to be produced and received by the at least one processor of the CPT, the payment gateway, the CPT host system, the component of a gaming establishment management system and/or the gaming device. In one embodiment, the at least one input device includes a payment device configured to communicate with the at least one processor of the CPT, the payment gateway, the CPT host system, the component of a gaming establishment management system and/or the gaming device to fund the CPT, the component of a gaming establishment management system and/or the gaming device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the CPT, the component of a gaming establishment management system and/or the gaming device to be funded via an electronic funds transfer, such as a transfer of funds from a bank account. In another embodiment, the CPT, the component of a gaming establishment management system and/or the gaming device includes a payment device configured to communicate with a mobile device of a user, such as a mobile phone, a radio frequency identification tag, or any other suitable wired or wireless device, to retrieve relevant information associated with that user to fund the CPT, the component of a gaming establishment management system and/or the gaming device. When the CPT, the component of a gaming establishment management system and/or the gaming device is funded, the at least one processor determines the amount of funds entered and displays the corresponding amount.

In various embodiments, the at least one input device includes a plurality of buttons that are programmable by the CPT, the payment gateway, the CPT host system, the component of a gaming establishment management system and/or the gaming device operator to, when actuated, cause the CPT, the payment gateway, the CPT host system, the component of a gaming establishment management system and/or the gaming device to perform particular functions. For instance, such buttons may be hard keys, programmable soft keys, or icons icon displayed on a display device of the CPT, the component of a gaming establishment management system and/or the gaming device that are actuatable via a touch screen of the CPT, the component of a gaming establishment management system and/or the gaming device or via use of a suitable input device of the CPT, the component of a gaming establishment management system and/or the gaming device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the CPT, the component of a gaming establishment management system and/or the gaming device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the CPT, the payment gateway, the CPT host system, the component of a gaming establishment management system and/or the gaming device. In one embodiment, a user input device docking region is provided, and includes a power distribution component that is configured to recharge a user input device without requiring metal-to-metal contact. In one embodiment, the at least one power distribution component is configured to distribute power to one or more internal components of the CPT, the payment gateway, the CPT host system, the component of a gaming establishment management system and/or the gaming device, such as one or more rechargeable power sources (e.g., rechargeable batteries) located at the CPT, the payment gateway, the CPT host system, the component of a gaming establishment management system and/or the gaming device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the CPT, the component of a gaming establishment management system and/or the gaming device; detecting the presence and/or identity of various persons (e.g., users, casino employees, etc.), devices (e.g., user input devices), and/or systems within a predetermined proximity to the CPT, the component of a gaming establishment management system and/or the gaming device.

The at least one data preservation component is configured to detect or sense one or more events and/or conditions that, for example, may result in damage to the CPT, the payment gateway, the CPT host system, the component of a gaming establishment management system and/or the gaming device and/or that may result in loss of information associated with the CPT, the payment gateway, the CPT host system, the component of a gaming establishment management system and/or the gaming device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the CPT, the payment gateway, the CPT host system, the component of a gaming establishment management system and/or the gaming device to operate in a mobile environment.

The at least one geolocation module is configured to acquire geolocation information from one or more remote sources and use the acquired geolocation information to determine information relating to a relative and/or absolute position of the CPT, the component of a gaming establishment management system and/or the gaming device. For example, in one implementation, the at least one geolocation module is configured to receive GPS signal information for use in determining the position or location of the CPT, the component of a gaming establishment management system and/or the gaming device. In another implementation, the at least one geolocation module is configured to receive multiple wireless signals from multiple remote devices (e.g., the CPT, the payment gateway, the component of a gaming establishment management system, the gaming device, servers, wireless access points, etc.) and use the signal information to compute position/location information relating to the position or location of the CPT, the component of a gaming establishment management system and/or the gaming device.

The at least one user identification module is configured to determine the identity of the current user or current owner of the CPT, the component of a gaming establishment management system and/or the gaming device. For example, in one embodiment, the current user is required to perform a login process at the CPT, the component of a gaming establishment management system and/or the gaming device in order to access one or more features. Alternatively, the CPT, the component of a gaming establishment management system and/or the gaming device is configured to automatically determine the identity of the current user based on one or more external signals, such as an RFID tag or badge worn by the current user and that provides a wireless signal to the CPT, the component of a gaming establishment management system and/or the gaming device that is used to determine the identity of the current user. In at least one embodiment, various security features are incorporated into the CPT, the component of a gaming establishment management system and/or the gaming device to prevent unauthorized users from accessing confidential or sensitive information.

The at least one information filtering module is configured to perform filtering (e.g., based on specified criteria) of selected information to be displayed at one or more displays of the CPT, the payment gateway, the CPT host system, the component of a gaming establishment management system and/or the gaming device.

In various embodiments, the CPT, the payment gateway, the CPT host system, the component of a gaming establishment management system and/or the gaming device includes a plurality of communication ports configured to enable the at least one processor of the CPT, the payment gateway, the CPT host system, the component of a gaming establishment management system and/or the gaming device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the CPT, the payment gateway, the CPT host system, the component of a gaming establishment management system and/or the gaming device has a support structure, housing, or cabinet that provides support for a plurality of the input devices and the output devices of the CPT, the payment gateway, the CPT host system, the component of a gaming establishment management system and/or the gaming device.

It should be appreciated that certain of the gaming devices of the present disclosure, such as EGMs located in a casino or another gaming establishment, include certain components and/or are configured to operate in certain manners that differentiate these gaming devices from general purpose computing devices, such as certain personal gaming devices (e.g., desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. An electronic gaming machine comprising:

a processor; and a memory device that stores a plurality of instructions that, when executed by the processor, cause the processor to:

responsive to an occurrence of a cashout event, determine a funding source of an amount of funds of a credit balance, responsive to the determined funding source of the amount of funds of the credit balance being a financial institution account maintained by a financial institution, automatically communicate, to a cashless payment terminal distinct from the electronic gaming machine, data associated with the amount of funds of the credit balance, wherein the cashless payment terminal operates, independent of the electronic gaming machine, with a payment gateway to cause, independent of any amounts of funds modifying any balances of any gaming establishment accounts, a transfer of the amount of funds of the credit balance to the financial institution account, and responsive to the determined funding source of the amount of funds of the credit balance being independent of the financial institution account maintained by the financial institution, enable a cashout of the amount of funds of the credit balance independent of the cashless payment terminal.

2. The electronic gaming machine of claim 1, wherein the memory device stores a plurality of further instructions that, when executed by the processor responsive to the determined funding source of the amount of funds of the credit balance being the financial institution account maintained by the financial institution and responsive to a receipt, from the cashless payment terminal, of data associated with a financial institution confirmation of a transfer of the amount of funds to the financial institution account, cause the processor to decrease the credit balance independent of any distribution of any physical currency and any distribution of any cashless ticket vouchers.

3. The electronic gaming machine of claim 1, wherein the memory device stores a plurality of further instructions that, when executed by the processor responsive to the occurrence of the cashout event, cause the processor to determine the funding source of the amount of funds of the credit balance responsive to a selection to transfer the amount of funds of the credit balance to the financial institution account.

4. The electronic gaming machine of claim 1, wherein the memory device stores a plurality of further instructions that, when executed by the processor responsive to the occurrence of the cashout event, cause the processor to determine the funding source of the amount of funds of the credit balance responsive to at least a threshold amount of the funds of the credit balance not being associated with any wagering activity.

5. The electronic gaming machine of claim 1, wherein the memory device stores a plurality of further instructions that, when executed by the processor responsive to the occurrence of the cashout event, cause the processor to determine the funding source of the amount of funds of the credit balance responsive to a limit being reached.

6. The electronic gaming machine of claim 1, wherein the financial institution account is associated with a payment instrument of one of a debit card and a credit card used as the funding source.

7. The electronic gaming machine of claim 1, wherein the memory device stores a plurality of further instructions that, when executed by the processor responsive to the determined funding source of the amount of funds of the credit balance being the financial institution account, cause the processor to cause a generation of a receipt in association with the cashout event.

8. The electronic gaming machine of claim 1, wherein the cashout of the amount of funds of the credit balance independent of the cashless payment terminal comprises one of a distribution of an amount of physical currency and a distribution of a cashless ticket voucher.

9. An electronic gaming machine comprising:

a processor; and a memory device that stores a plurality of instructions that, when executed by the processor, cause the processor to:

responsive to a receipt, from a cashless payment terminal distinct from the electronic gaming machine, of data associated with a first amount of funds transferred from a financial institution account maintained by a financial institution:

increase, independent of any amounts of funds modifying any balances of any gaming establishment accounts, a credit balance based on the first amount of funds, and disable a funding source different from the cashless payment terminal, and responsive to a receipt, from the funding source different from the cashless payment terminal, of data associated with a second amount of funds received independent of any financial institution account maintained by any financial institution:

increase the credit balance based on the second amount of funds, and disable the cashless payment terminal.

10. The electronic gaming machine of claim 9, wherein the funding source different from the cashless payment terminal comprises one of an amount of physical currency and a cashless ticket voucher.

11. The electronic gaming machine of claim 9, wherein the memory device stores a plurality of further instructions that, when executed by the processor responsive to the receipt, from the funding source different from the cashless payment terminal, of data associated with the second amount of funds received independent of any financial institution account maintained by any financial institution, cause the processor to enable the cashless payment terminal responsive to an occurrence of a cashout event.

12. The electronic gaming machine of claim 9, wherein the memory device stores a plurality of further instructions that, when executed by the processor responsive to the receipt, from the funding source different from the cashless payment terminal, of data associated with the second amount of funds received independent of any financial institution account maintained by any financial institution, cause the processor to enable the cashless payment terminal responsive to the credit balance being reduced to a threshold amount.

13. A method of operating an electronic gaming machine, the method comprising:

responsive to an occurrence of a cashout event, determining, by a processor, a funding source of an amount of funds of a credit balance, responsive to the determined funding source of the amount of funds of the credit balance being a financial institution account maintained by a financial institution, automatically communicating, to a cashless payment terminal distinct from the electronic gaming machine, data associated with the amount of funds of the credit balance, wherein the cashless payment terminal operates, independent of the electronic gaming machine, with a payment gateway to cause, independent of any amounts of funds modifying any balances of any gaming establishment accounts, a transfer of the amount of funds of the credit balance to the financial institution account, and responsive to the determined funding source of the amount of funds of the credit balance being independent of the financial institution account maintained by the financial institution, enabling, by the processor, a cashout of the amount of funds of the credit balance independent of the cashless payment terminal.

14. The method of claim 13, further comprising, responsive to the determined funding source of the amount of funds of the credit balance being the financial institution account maintained by the financial institution and responsive to a receipt, from the cashless payment terminal, of data associated with a financial institution confirmation of a transfer of the amount of funds to the financial institution account, decreasing, by the processor, the credit balance independent of any distribution of any physical currency and any distribution of any cashless ticket vouchers.

15. The method of claim 13, further comprising, responsive to the occurrence of the cashout event, determining, by the processor, the funding source of the amount of funds of the credit balance responsive to a selection to transfer the amount of funds of the credit balance to the financial institution account.

16. The method of claim 13, further comprising, responsive to the occurrence of the cashout event, determining, by the processor, the funding source of the amount of funds of the credit balance responsive to at least a threshold amount of the funds of the credit balance not being associated with any wagering activity.

17. The method of claim 13, further comprising, responsive to the occurrence of the cashout event, determining, by the processor, the funding source of the amount of funds of the credit balance responsive to a limit being reached.

18. The method of claim 13, wherein the financial institution account is associated with a payment instrument of one of a debit card and a credit card used as the funding source.

19. The method of claim 13, further comprising, responsive to the determined funding source of the amount of funds of the credit balance being the financial institution account, causing, by the processor, a generation of a receipt in association with the cashout event.

20. The method of claim 13, wherein the cashout of the amount of funds of the credit balance independent of the cashless payment terminal comprises one of a distribution of an amount of physical currency and a distribution of a cashless ticket voucher.

* * * * *